United States Patent

Shastri

(10) Patent No.: US 6,730,772 B2
(45) Date of Patent: May 4, 2004

(54) DEGRADABLE POLYMERS FROM DERIVATIZED RING-OPENED EPOXIDES

(76) Inventor: Venkatram P. Shastri, 1134 Bethlehem Pike, Lower Gwynedd, Ambler, PA (US) 19002

( * ) Notice: Subject to any disclaimer, the term of this patent is extended or adjusted under 35 U.S.C. 154(b) by 0 days.

(21) Appl. No.: 09/886,394

(22) Filed: Jun. 22, 2001

(65) Prior Publication Data

US 2003/0050426 A1 Mar. 13, 2003

(51) Int. Cl.[7] ............... C08G 63/08; C08G 64/02; C08G 65/26; C08G 65/331; C08G 65/332
(52) U.S. Cl. ............... 528/354; 528/357; 528/370; 528/409; 528/421
(58) Field of Search ............... 528/354, 357, 528/359, 409, 421, 370

(56) References Cited

U.S. PATENT DOCUMENTS

| | | |
|---|---|---|
| 3,065,213 A | 11/1962 | Vandenberg |
| 3,737,337 A | 6/1973 | Schnoring et al. ............ 117/100 |
| 3,907,718 A | 9/1975 | Hall et al. ............ 252/522 |
| 4,195,167 A | 3/1980 | Knopf et al. ............ 528/408 |
| 4,389,330 A | 6/1983 | Tice et al. ............ 427/213.36 |
| 4,644,038 A | 2/1987 | Protzman ............ 525/412 |
| 4,745,171 A * | 5/1988 | Sato et al. ............ 528/116 |
| 4,804,663 A | 2/1989 | Kennis et al. ............ 514/258 |
| 5,019,400 A | 5/1991 | Gombotz et al. ............ 424/497 |
| 5,158,952 A | 10/1992 | Janssen et al. ............ 514/258 |
| 5,340,849 A | 8/1994 | Dunn et al. ............ 523/113 |
| 5,359,026 A | 10/1994 | Gruber ............ 528/354 |
| 5,407,609 A | 4/1995 | Tice et al. ............ 264/46 |
| 5,525,702 A | 6/1996 | Nace ............ 528/354 |
| 5,608,034 A | 3/1997 | Falling et al. ............ 528/409 |
| 5,626,863 A | 5/1997 | Hubbell et al. ............ 424/426 |
| 5,639,413 A | 6/1997 | Crivello ............ 264/401 |
| 5,650,173 A | 7/1997 | Ramstack et al. ............ 424/489 |
| 5,654,008 A | 8/1997 | Herbert et al. ............ 424/489 |
| 5,702,717 A | 12/1997 | Cha et al. ............ 424/425 |
| 5,718,921 A | 2/1998 | Mathiowitz et al. ............ 424/497 |
| 5,792,477 A | 8/1998 | Rickey et al. ............ 424/501 |
| 5,797,898 A | 8/1998 | Santini, Jr. et al. ............ 604/890.1 |
| 5,817,343 A | 10/1998 | Burke ............ 424/489 |
| 5,837,752 A | 11/1998 | Shastri et al. ............ 523/116 |
| 5,844,016 A | 12/1998 | Sawhney et al. ............ 522/13 |
| 5,874,064 A | 2/1999 | Edwards et al. ............ 424/46 |
| 5,902,599 A | 5/1999 | Anseth et al. ............ 424/426 |
| 5,916,598 A | 6/1999 | Rickey et al. ............ 424/501 |
| 5,922,253 A | 7/1999 | Herbert et al. ............ 264/5 |
| 5,945,126 A | 8/1999 | Thanoo et al. ............ 424/489 |
| 5,968,542 A | 10/1999 | Tipton ............ 424/423 |
| 5,989,463 A | 11/1999 | Tracy et al. ............ 264/4.1 |
| 6,004,573 A | 12/1999 | Rathi et al. ............ 424/426 |
| 6,051,248 A | 4/2000 | Sawhney et al. ............ 424/426 |
| 6,103,255 A | 8/2000 | Levene et al. ............ 424/426 |
| 6,110,503 A | 8/2000 | Rickey et al. ............ 424/501 |
| 6,136,295 A | 10/2000 | Edwards et al. ............ 424/45 |
| 6,143,314 A | 11/2000 | Chandrashekar et al. ... 424/426 |
| 6,153,211 A | 11/2000 | Hubbell et al. ............ 424/426 |
| 6,160,084 A | 12/2000 | Langer et al. ............ 528/272 |
| 6,183,781 B1 | 2/2001 | Burke ............ 424/486 |
| 6,201,065 B1 | 3/2001 | Pathak et al. ............ 528/90 |
| 6,221,977 B1 | 4/2001 | Park et al. ............ 525/408 |
| 6,235,224 B1 | 5/2001 | Mathiowitz et al. ............ 264/4 |

FOREIGN PATENT DOCUMENTS

| | | | |
|---|---|---|---|
| JP | 61-192370 A | * | 8/1986 |
| JP | 06-084203 A1 | | 3/1994 |
| JP | 9-194565 A | * | 7/1997 |
| WO | WO 00/74844 A1 | | 12/2000 |

OTHER PUBLICATIONS

Jun–Kang Liu, et al., "Reactions of Silyl Ketene Acetal–-Functionalized Polysiloxanes. Synthesis of Sulfonated Polysiloxanes," Macromolecules, 1994, 27:4080–4083.
Byeongmoon Jeong, et al., "Thermogelling Biodogradable Polymers with Hydrophilic Backbones: PEG–g–PLGA," Macromolecules 2000, 33, pp. 8317–8322.
Hardwood academic publishers, "Handbook of Biodegradable Polymers," Chapters 6 and 7, 1997.

* cited by examiner

*Primary Examiner*—Robert E. Sellers, II
(74) *Attorney, Agent, or Firm*—David P. Ruschke; Andrea G. Reister; Covington & Burling

(57) ABSTRACT

A polymer of a ring-opened functionalized epoxide is formed by the polymerization of a functionalized epoxide monomer having the structure E-CHR-G wherein E represents an epoxide group, R is hydrogen or an alkyl group, and G is a derivatizable group such as an unsaturated functionality or ester substituent.

36 Claims, 16 Drawing Sheets

E = EPOXIDE, i.e. $(CH_2OCH)$-

G = DERIVATIZABLE OR DERIVATIZED GROUP CONTAINING FUNCTIONALITY

R = H OR ANY ALKYL GROUP

POLY (L-LACTIDE-co-GLYCOLIDE-co-PEG-MPO)

DEGRADABLE POLYMERS FROM DERIVATIZED RING-OPENED EPOXIDES

BACKGROUND OF THE INVENTION

1. Field of the Invention

The present invention relates to the synthesis of degradable polymers. More particularly, the present invention relates to degradable polymers having increased functionality.

2. Related Art

Interest in the synthesis of new degradable polymers has expanded in recent years. This increased interest stems in part from the concern that the extensive and continuing use of polymers in today's society will result in environmental damage. The concern is that many polymers used in commercial applications are inert and thus able to withstand natural processes that cause other non-inert materials to disintegrate and decompose. As a result of this inertness, polymers have accumulated in landfills and thereby have contributed to the shortage of landfill space generally. This problem will only be exacerbated as polymers are used in more and more commercial products and services. Thus, there is a need for developing polymers for commercial applications that have an enhanced ability to degrade.

The increased interest in the synthesis of new degradable polymers also stems in part from the use of synthetic polymers in medical applications. In medical applications, not only must the polymer be able to degrade, but the degradation products also must be compatible with the human body, i.e., be nontoxic. In this situation, the polymers are termed biodegradable, indicating their ability to degrade due to biological processes occurring inside the human body. As early as the 1960s, synthetic polymers were used in the field of surgical medicine as suture material. The polymeric suture material was both biodegradable and absorbable, that is, the polymers decomposed after a period of time after implantation in the human body, and those decomposition products were absorbed by the human body without any adverse or toxic effects. The advantage of biodegradable polymer-based suture materials is the ability to fabricate fibers with varying absorption rates to match the healing profiles of the tissues they help to repair. Another advantage of such polymer-based sutures over traditional silk and gut sutures is enhanced versatility and low tissue reactivity.

In addition to use as suture material, degradable polymers have been used in other biomedical applications, such as polymer-based drug delivery systems. In such a system, degradable polymers are used as a matrix for the controlled or sustained delivery or release of biologically active agents, such as, drugs, to the human body. In addition, the development of endoscopic surgical techniques has resulted in the need for developing such degradable drug delivery systems wherein the placement of the drug delivery device is targeted for specific anatomical locations. Examples of such polymer-based drug delivery systems are described in the following U.S. patents: U.S. Pat. No. 6,183,781, entitled "Method for Fabricating Polymer-based Controlled-release Devices"; U.S. Pat. No. 6,110,503, entitled "Preparation of Biodegradable, Biocompatible Microparticles Containing a Biologically Active Agent"; U.S. Pat. No. 5,989,463, entitled "Methods for Fabricating Polymer-based Controlled-release Devices"; U.S. Pat. No. 5,916,598, entitled "Preparation of Biodegradable, Biocompatible Microparticles Containing a Biologically Active Agent"; U.S. Pat. No. 5,817,343, entitled "Method for Fabricating Polymer-based Controlled-release Devices"; U.S. Pat. No. 5,650,173, entitled "Preparation of Biodegradable, Biocompatible Microparticles Containing a Biologically Active Agent." Other examples of polymer-based drug delivery systems are described in U.S. Pat. No. 5,922,253, entitled "Production Scale Method of Forming Microparticles" and U.S. Pat. No. 5,019,400, entitled "Very Low Temperature Casting of Controlled Release Microspheres," the technology described therein also known as Prolease®. All of the above-identified patent applications are assigned to Alkermes Controlled Therapeutics, Inc. of Cambridge, Mass., and are incorporated herein by reference.

Degradable polymers have also been used in other biomedical applications, including use as polymer scaffolds for tissue engineering. In this biomedical application, porous polymer scaffolds are shaped into articles for tissue engineering and tissue guided regeneration and repair applications, including reconstructive surgery. Scaffold applications include the regeneration of tissues such as nervous, musculoskeletal, cartilaginous, tendenous, hepatic, pancreatic, ocular, integumentary, arteriovenous, urinary or any other tissue forming solid or hollow organs. Scaffolds have been used as materials for vascular grafts, ligament reconstruction, adhesion prevention and organ regeneration. In one embodiment, the polymer scaffold provides physical support and an adhesive substrate for isolated cells during in vitro culturing and subsequent in vivo implantation in the human body. An alternate use of degradable polymer scaffolds is to implant the scaffold directly into the body without prior culturing of cells onto the scaffold in vivo. Once implanted, cells from the surrounding living tissue attach to the scaffold and migrate into it, forming functional tissue within the interior of the scaffold. Regardless of whether the scaffold is populated with cells before or after implantation, the scaffold is designed so that as the need for physical support of the cells and tissue diminishes over time, the scaffold will degrade. Degradable polymer scaffolds are described, for example, in U.S. Pat. No. 6,103,255, entitled "Porous polymer scaffolds for tissue engineering," and is incorporated herein by reference.

Additional biomedical applications for synthetic biodegradable polymers include use with fracture fixation, for example, as absorbable orthopedic fixation devices. In particular, such biodegradable polymers permit treatment of bone fractures through fixation, providing good tissue/material compatibility, and facile molding (into potentially complex shapes) for easy placement. Controlled degradation of the polymers permits optimum bone function upon healing. The materials can reestablish the mechanical integrity of the bone and subsequently degrade to allow new bone formation to bear load and remodel. These biodegradable polymers maintain mechanical integrity while undergoing a gradual degradation and loss in size permitting bone ingrowth. In contrast to the traditional use of steel fixation devices, the degradable polymer-based device is advantageous in those situations where the device is not needed permanently or would require removal at a later point in time. Also, metallic orthopedic devices shield stress during healing and can lead to bone atrophy. Polymers for use in such orthopedic applications are described in U.S. Pat. No. 5,902,599, entitled "Biodegradable Polymer Networks for Use in Orthopedic and Dental Applications," and U.S. Pat. No. 5,837,752, entitled "Semi-Interpenetrating Polymer Networks," both of which are incorporated herein by reference. U.S. Pat. No. 5,902,599 also describes synthetic biodegradable polymers for use in dental applications.

The wide variety of commercial and biomedical applications just described for synthetic degradable polymers demonstrates the need for the development of multiple types of polymers with varying degradability profiles.

Synthetic polymers for use in commercial applications are legion. For example, polyethylene, polypropylene, and polystyrene are commercially produced polymers wherein monomer units of ethylene, propylene, and styrene, respectively, are sequentially added to a growing polymer chain by a process known as addition polymerization. The incorporation of monomer units into the polymer continues until the polymerization process is terminated by the addition of a compound that reacts with the end of the polymer chain and which itself is incapable of polymerization, thus quenching the polymerization.

Dacron is a commercial polyester synthesized by the condensation polymerization reaction of dimethyl terephthalate and ethylene glycol. With condensation polymerization, monomers are heated together in order to combine or condense them, forming a polymer. In addition to the formation of the polymer, a small organic by-product is also formed and is known as an elimination by-product. To form Dacron, the dimethyl terephthalate condenses with the ethylene glycol to form the polyester polymer and methanol as the elimination by-product.

A drawback to these mechanisms of generating commercial polymers is the reaction conditions under which polymerization occurs. Typically, high temperatures and pressures are required in order to induce polymerization. Because such severe conditions are required, only monomers that are able to withstand those temperatures and pressures can be used. Such monomers generally possess limited functionality, for under the severe reaction conditions, any functionality present on the monomer in the form of substituents would most likely be eliminated or cleaved from the monomer and/or the polymer. These restrictions on incorporating functionality into polymer systems have limited the ability to synthesize polymers with certain desirable properties, such as degradability generally, and biodegradability specifically. The latter is important if the polymer is to have medical applications as discussed above.

Of course catalysts are known to be used in polymerization reactions in order to avoid the high polymerization temperatures and pressures described above. A catalyst is used to facilitate polymerization by lowering the energy barrier that reacting monomers must overcome in order to initiate polymerization. The catalyst is often a metal or organometallic compound, which reacts with the monomers, but is not itself incorporated into the final polymer structure. But while catalysts can improve polymerization reaction conditions, catalysts cannot by themselves solve the problem of increasing functionality in the resulting polymer, particularly if the monomers themselves are incapable of supporting functionality themselves. Thus, a need remains for an acceptable method of synthesizing functionalized polymers under mild conditions with desirable characteristics such as enhanced degradability.

Synthetic degradable absorbable polymers already developed to date for use in biomedical applications include, for example, poly(p-dioxanone), which is an alternating ether-ester polymer, and its copolymers; polycaprolactone; polyhydroxyalkanoates; poly(propylene fumarate); poly(ortho esters); other polyesters including poly(block-ether esters), poly(ester amides), poly(ester urethanes), polyphosphonate esters, and polyphosphoesters; polyanhydrides; polyphosphazenes; poly(alkylcyanoacrylates); and polyacrylic acids, polyacrylamides, and their hydrogels. These synthetic absorbable polymers are discussed in detail in *Handbook of Biodegradable Polymers*, edited by Domb, Kost, and Wiseman (Harwood Academic Pub. 1997), incorporated herein by reference. Specifically, chapter 6 discusses poly(ortho esters) and chapter 7 discusses other functionalized polyesters. However, the ability to incorporate functionality into the polyester is limited by the low reactivity of the functionalized monomers. Using as an example monomeric precursors for poly(ester amides), it is known that functionalized morpholine-2,5-diones, known as depsipeptides, can be synthesized by the condensation of $\alpha$-hydroxy acid with an $\alpha$-amino acid. These derivatized depsipeptides can be copolymerized with lactones; however, less than 1% of the functionalized depsipeptide monomers are incorporated into the resulting copolymer. Thus, there is a need for new synthetic routes to functionalized polyester polymers.

In addition, synthetic polymers based on the polymerization of caprolactone, lactic acid, and glycolic acid have become mainstays in the field of degradable polymers, in particular the field of degradable polyesters, and are available commercially. Caprolactone is the cyclic ester derivative of caproic acid, $CH_3(CH_2)_4CO_2H$, and can be ring-opened to form the polyester poly(caprolactone), $—[(CH_2)_5 CO_2]—$. It should be noted that caprolactone has two structural isomers, designated $\epsilon$ and $\delta$ caprolactone. Any discussion of caprolactone generally applies to both forms, unless specifically noted. Lactic acid- and glycolic acid-based polymers with high molecular weights are not obtained through direct condensation of the corresponding carboxylic acid due to reversibility of the condensation reaction, backbiting reactions, and the high degree of conversion required. Rather, lactic acid- and glycolic acid-based polymers are typically obtained by ring-opening polymerization of the corresponding diester dimers, lactide and glycolide, respectively, themselves. Alternatively, the reaction can be carried out as a condensation of lactic and glycolic acid. The resulting polymers of these polymerization reactions are poly(lactic acid), also referred to as poly(lactide), abbreviated PLA and poly(glycolic acid), also referred to as poly(glycolide), abbreviated PGA. Copolymers incorporating both monomers are also available and are termed poly(lactide-co-glycolides) abbreviated PLGA and poly(glycolide-co-lactides) abbreviated PGLA, or collectively PLGs. U.S. Pat. No. 5,650,173, incorporated herein by reference, describes examples of these commercially available polymers and copolymers based on lactic acid and glycolic acid. It should be noted that lactide has two structural isomers, denoted D and L. Any discussion of lactide generally is referring to a racemic mixture of both isomers, i.e., d,l-lactide, unless specifically noted.

In addition to the polymers based solely on caprolactone, lactic acid and glycolic acid, degradable polymers can be synthesized in which additional monomer units are incorporated into the backbone of poly(caprolactone), PLA, PGA, or PLGs. In particular, copolymerization with preformed polymers having a hydrophilic segment can be used. Such hydrophilic segments include any number of segments based on diol- or glycol-containing linkages, for example, polyethylene glycol (PEG), also known as polyethylene oxide (PEO), polypropylene oxide (PPO), and pluronics. The resulting copolymers, thus include lactide and/or glycolide monomer units along with the polyether hydrophilic core initiating segment as a single block in the backbone of the polymer. For example, a PEG with molecular weight of 600 would consist of a block of at least 13 monomer units. Other polymers have multiple large segments or blocks of PEG alternating with blocks of a polyester. For example, Polyactive®, is a copolymer that has large blocks of PEG alternating with blocks of poly(butylene terephthalate).

All of these polymers and copolymers derived from caprolactone, lactic and glycolic acid, with or without additional hydrophilic segments, contain ester linkages in the backbone of the polymer chain. The presence of this ester linkage provides the necessary functionality to permit degradability, particularly biodegradability. As opposed to other linkages, such as amides, which require severe conditions in order to decompose, the ester linkage undergoes hydrolysis under even mildly basic conditions such as those found in vivo. In contrast, the amide linkage requires more stringent conditions and is not easily hydrolyzed even under strongly acidic or basic conditions. In vivo, the only available route for cleavage of an amide bond is enzymatic, and that cleavage is often specific to the amino acid sequence. The highly crystalline nature of polyamides, e.g., nylon, further slows degradation by preventing or blocking access to the amide bond by water molecules and enzymes.

However, all of these polyester polymer formulations just described for biomedical applications suffer from a number of disadvantages. It is true that polymerizations involving ring-opening polymerization of caprolactone, lactide, and glycolide occur under milder conditions compared to the industrial, commercial polymerizations of ethylene, propylene, styrene, and dimethyl terephthalate. Nevertheless, like those commercially generated polymers, polymers generated by ring-opening polymerization of caprolactone, lactide, and glycolide lack the ability to support a wide variety of structural functionality, which in turn restricts their functional versatility. This is because the cyclic ester caprolactone and the dimeric cyclic esters, lactide and glycolide, themselves are incapable of supporting a wide variety of functionality, thus precluding incorporation of such functionality into the polyester polymer, even though the polymerization occurs under relatively mild conditions.

The synthesis of functionalized polymers is the key to the development of a new generation of degradable polymers for commercial and biomedical applications. The ability to incorporate more varied structural features into the polymer permits increased functionality and uses for the polymer in a wider variety of applications. As the above discussion demonstrated in the context of biomedical applications, degradable polymers are presently used for matrices for delivery of bioactive substances, for use as scaffolding in tissue engineering, for use as sutures, for fracture fixation, in dental applications, as sealants, as well as in other applications. However, the full potential of this family of polymers based on cyclic ester monomers cannot be realized given the restrictions on incorporation of structural functionality into the polymer.

Control over functionality will also permit greater control over polymer degradation. Biodegradability, as well as biocompatibility, of polymers are important characteristics if the polymer is to be used for biomedical applications as discussed above. The creation of polymers in today's society and the exponential use in all areas of society has also created environmental concerns over whether such polymers will degrade or will end up in landfills forever. Biodegradability of polyester polymers depends on the ability of the ester linkage in the polymer backbone to hydrolyze, that is, to decompose in the presence of water. The ability of that linkage to hydrolyze, and the time frame over which such decomposition occurs, is influenced by the surrounding substituents. Thus, control over the functionality introduced into the polymer through selection of appropriate substituted monomers will greatly affect the ability to control the degradation of the polymer.

Incorporation of functionality also allows greater processing options for use in various applications. Being able to control what types of substituted monomers can be incorporated into the polymer allows control over the physical characteristics of the resulting polymer. Those physical characteristics are important in determining the consistency of the polymer and what types of processing steps the polymer can withstand. This in turn will determine to what applications particular polymers will be most suited.

For example, including functionality attached to the polymer backbone that can be crosslinked, such as through photocuring, radiation, or by chemical means, will produce polymers with the desirable physical characteristics of having high mechanical strength while having a low molecular weight. Examples of such cross-linkable polymeric systems are the following: U.S. Pat. No. 5,626,863, issued to Hubbell et al., entitled "Photopolymerizable Biodegradable Hydrogels as Tissue Contacting materials and Controlled-Release Carriers"; U.S. Pat. No. 5,844,016, issued to Sawhney et al., entitled "Redox and Photoinitiator Priming for Improved Adherence of Gels to Substrates"; U.S. Pat. No. 6,051,248, issued to Sawhney et al., entitled "Compliant "Tissue Sealants"; U.S. Pat. No. 6,153, 211, issued to Hubbell et al., entitled "Biodegradable Macromers for the Controlled Release of Biologically Active Substances"; U.S. Pat. No. 6,201,065, issued to Pathak et al., entitled "Multiblock Biodegradable Hydrogels for Drug Delivery and Tissue Treatment." All of the aforementioned patents are incorporated herein by reference.

As another example, control over the functionality also permits design of polymers capable of undergoing phase transitions when in contact with physiological conditions. One type of such polymers is a liquid at room temperature but gel at body temperatures, i.e., so-called thermoresponsive polymers, which enhances ease of injection of the polymer into a human or animal body. Such polymer systems are discussed, for example, in U.S. Pat. No. 5,702,717, issued to Cha, et al., entitled "Thermosensitive Biodegradable Polymers Based on Poly(Ether-Ester) Block Copolymers," and U.S. Pat. No. 6,004,573, issued to Rathi et al., entitled "Biodegradable Low Molecular Weight Triblock Poly(Lactide-Co-Glycolide) Polyethylene Glycol Copolymers Having Reverse Thermal Gelation Properties," both of which are incorporated herein by reference. A second type of polymer capable of undergoing such phase transitions involves injection of polymer dissolved in a solvent, which after introduction into the body, the solvent is replaced by water, resulting in solidification of the polymer. Such polymer systems are exemplified by U.S. Pat. No. 5,968,542, issued to Tipton, entitled "High Viscosity Liquid Controlled Delivery System as a Device"; U.S. Pat. No. 6,143,314, issued to Chandrashekar et al., entitled "Controlled Release Liquid Delivery Compositions with Low Initial Drug Burst"; and U.S. Pat. No. 5,340,849, issued to Dunn et al., entitled "Biodegradable In-Situ Forming Implants and Methods for Producing the Same," all three patents incorporated herein by reference. An additional example of the benefits of control over the functionality and hence the physical properties of the polymer is the ability to have greater control over the diffusion or penetration of water into the polymer. This permits control over the degree of bulk versus surface erosion of the polymer, which is controlled in part by the hydrophilic-lipophilic balance (HLB) in a system.

Attempts have been made to incorporate epoxides into various polymer systems. Epoxides are known to undergo ring-opening polymerization, a process which takes advantage of the fact that cyclic monomers inherently have associated ring strain, which is inversely proportional to the size of the ring. The greater the ring strain, the less energy required to open the ring, and the milder the reaction conditions necessary to achieve polymerization. However, even though the ring-strain associated with epoxides facilitates ring-opening, epoxides require basic conditions in the presence of a solvent in order to effect polymerization. Any functionality on the epoxide will be removed as a result of exposure to the basic solvent system. Also, polymerization under these conditions does not permit control over the polymerization itself due to random hydrolysis of chemical bonds. Thus, even though epoxides may be functionalized with various substituents, polymerization under mild conditions to maintain that functionality in the resulting polymer remains elusive.

One example of using epoxides to produce copolymers is described in U.S. Pat. No. 4,195,167, issued to Knopf et al., entitled "Gradient Polymers of Two or More Cyclic, Organic, Ring-Opening, Addition Polymerizable Monomers and Methods for Making Same." This patent describes the formation of copolymers of ethylene oxide and propylene oxide using a basic catalyst, e.g., potassium hydroxide, at temperatures above 100° C.

Another example of using epoxides to produce copolymers is described in U.S. Pat. No. 6,221,977, issued to Park et al., entitled "Biodegradable Aliphatic Polyester Grafted with Polyether and a Process for Preparing the Same." This patent describes the formation of grafted polymers wherein an epoxide, i.e., epichlorohydrin, is reacted with polyethyleneglycolmethylether (PEGME), to form an epoxide substituted with a polyether linkage. That substituted epoxide is then reacted with an ester to form a polyester polymer grafted to a side chain composed of PEGME through an ether linkage.

Another example involving epoxides to produce copolymers is described in an article by Jeong et al., entitled "Thermogelling Biodegradable Polymers with Hydrophilic Backbones: PEG-g-PLGA," in *Macromolecules,* 2000, 33, 8317–22. That article describes the sequential synthesis of a copolymer using preformed PEG in the backbone grafted to side chains derived from lactide and glycolide.

Another example where epoxides have been used to form copolymers is described in U.S. Pat. No. 5,359,026, issued to Gruber, entitled "Poly(Lactide) Copolymer and Process for Manufacture Thereof." That patent describes copolymerization of lactide with an epoxidized fat or oil, e.g., linseed oil, for the purpose of forming copolymers with improved processing properties. However, the epoxides disclosed in that patent are not functionalized. Moreover, those epoxides are actually multiple epoxides (polyepoxides), rather than monomeric epoxides, when reacted with lactide, requiring temperatures in excess of 180° C.

Because at present synthesis of polymers with particular functionality is limited as a result of the conditions under which polymerization occurs and/or as a result of the limited structural functionalization possible of the reactant monomers themselves, there is a need in the art to develop synthetic methods to create polymers with a wider variety of structural functionalization. There is a further need in the art to synthesize such polymers so as to enhance the ability to control the degradation of the polymers in commercial and biomedical applications.

The present invention, the description of which is fully set forth below, solves the need in the art for development of such functionalized, degradable polymers.

SUMMARY OF THE INVENTION

The present invention provides for the synthesis of various functionalized polymers. The functionalized polymers are synthesized through the process of ring-opening polymerization. Polymerization occurs under mild conditions. The functionalization of the polymers permits control over certain properties of the polymers, in particular, the degradation of the polymers.

In one embodiment of the invention, functionalized epoxides are synthesized for use as monomers in polymerization reactions. These functionalized epoxide monomers can be viewed as having the structure E—CHR—G. In this structural representation, E represents the epoxide moiety itself, i.e.,

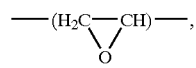

the three-membered cyclic ether structure typical of epoxides. R represents hydrogen or any alkyl group. G represents a derivatizable group. The derivatizable group can contain any functional group capable of bonding to the (E—CHR)— moiety and can contain a wide variety of functionality. Such derivatizable groups can include a degradable moiety, i.e., one that is susceptible to decomposition under appropriate conditions, such as neutral, acid, or base hydrolysis.

In a further embodiment of the invention, the above-described functionalized epoxides are polymerized by ring-opening polymerization. The ring-opening polymerization occurs under mild conditions using an initiating system. The initiating system of the present invention includes any system capable of ring-opening polymerization.

The homopolymer resulting from the ring-opening polymerization of the functionalized epoxides is comprised of repeating ethoxy ether units, i.e., the ring-opened

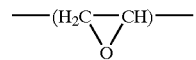

epoxide moiety, with the functionalized side chain of the original functionalized epoxide, i.e., the derivatizable group G, appended to one of the carbon atoms of each of the repeating ethoxy ether units. Because use of the initiating systems of the present invention permits polymerization under mild conditions, the side chain can support a wide variety of structural functionalization, as noted above in the discussion of the synthesis of the functionalized monomer units. The present invention contemplates such homopolymers containing side chains linked to the backbone of the polymer through a degradable linkage.

In addition to the above-described synthesis of functionalized epoxides before subsequent polymerization to form a homopolymer, the present invention contemplates functionalizing the side chain of the epoxide after the epoxide has been ring-opened and the polymer formed. In this sense, the epoxide is functionalizable or derivatizable, rather than already functionalized or derivatized.

In still another embodiment of the invention, ring-opening polymerization is used to copolymerize the above-described functionalized epoxides with cyclic esters. The ring-opening polymerization occurs under mild conditions, using an initiating system. The initiating systems that can be used for these copolymerization reactions are the same as those described above for the homopolymerization reactions.

Preferably, the initiating system comprises an organotin catalyst and an alcohol-containing species. The resulting copolymer is comprised of both the ring-opened functionalized epoxide, in the form of ethoxy ether units, and the ring-opened cyclic ester, in the form of ester units. The functionality of the epoxide monomer can be as described above. The present invention contemplates copolymers containing side chains linked to the backbone of the copolymer through a degradable linkage. The ethoxy ether units are randomly distributed throughout the polyester polymer backbone. A random distribution of ethoxy ether units in the backbone means that there are no large regions of exclusively either polyester units or polyethoxy ether units that would otherwise impart dominant physical characteristics, e.g., hydrophilicity or hydrophobicity, on a microscopic level. Rather, the ethoxy ether units are incorporated proportionally into the polymer backbone based on the amount of functionalized epoxide in the feed initially. Stated another way, no regions containing exclusively sequential ethoxy ether units are present in the backbones of the polymers of the present invention, such that an ethoxy ether unit is repeated no more than 10 times, preferably no more than 7 times, more preferably no more than 6 times, and most preferably no more than 5 times The cyclic ester monomer can be any cyclic ester susceptible to ring-opening polymerization. Preferably, the cyclic ester is either lactide, glycolide, caprolactone, 1,4-dioxan-2-one, or a cyclic carbonate.

In addition to the above-described synthesis of functionalized epoxides before subsequent polymerization to form a copolymer with cyclic esters, the present invention contemplates functionalizing the side chain of the epoxide monomer after the epoxide has been ring-opened and the copolymer with the ring-opened cyclic ester formed.

Viewed from a further aspect, the present invention provides for functionalizing the epoxide to provide for greater control over the degradation of the resultant homopolymer. Similarly, the present invention provides for functionalizing the epoxide to provide for greater control over the degradation of the resultant copolymer when the functionalized epoxide is polymerized with cyclic esters.

Viewed from yet a further aspect, the present invention relates to improved methods of preparing a pharmaceutical composition in particulate or capsule form. In one aspect of the invention, the pharmaceutical composition is designed for the controlled release of an effective amount of an active agent over an extended period of time. The methods of the present invention may be carried out using preformed particulates, or may additionally comprise the production of the particulates.

Viewed from still another aspect, the present invention relates to methods of using the functionalized homopolymers and copolymers in various applications. In one aspect of the invention, the functionalized polymers as described herein can be used for biomedical applications such as orthopedic and dental applications, prosthetic devices, tissue sealant and wound healing, tissue engineering, and bone replacement/healing. In another aspect of the invention, the functionalized polymers described herein can be used as environmentally friendly polymers.

Features and Advantages

The present invention advantageously can be used for the synthesis of functionalized degradable polymers heretofore unavailable through standard synthetic methods. The synthetic methods of the present invention are easily adaptable to existing polymer synthesis protocols. The present invention offers the ability for extensive and diverse functionalization of the parent polymer system due to the ease of synthesis of a wide variety of functionalized epoxide monomers, allowing for easy derivatization either before or after polymerization.

Another advantage of the present invention is that the functionalized epoxide monomers described herein, can aid in the solubilization of other monomers in copolymerization reactions due to the fact that the functionalized epoxides are typically liquids, thus, allowing for the use of milder polymerization conditions. Those other monomers include molecules such as lactide, glycolide, and any other monomer that requires either high temperatures to induce melting or the use of secondary solvents. The solubilization properties of the functionalized epoxides allow for mild copolymerization reaction conditions, i.e., lower reaction temperatures and pressures, and milder catalyst systems. Not requiring a separate solvent phase in which to carry out the polymerizations greatly enhances the ability to retain functionality in the resulting polymer by avoiding any possible detrimental side reactions between the solvent and the monomers as well. The solubilization by the functionalized epoxide also permits formation of copolymers in a single step, rather than sequentially involving numerous steps.

Additionally, because the result of the copolymerization of the functionalized epoxide and the cyclic ester is a polymer backbone that is a derivative of both polyethylene oxide and cyclic esters (i.e., the standard synthesis of degradable polyesters), toxicity issues should be minimal, if not nonexistent. Although polymers consisting of both polyether and polyester are known, the polyether exists as only a few higher molecular weight segments which are nondegradable, whereas the copolymers of the present invention result in ether functionality distributed throughout the polyester. This allows the copolymer to be degraded into smaller molecules, e.g., having a molecular weight less than 600, which are more easily metabolized or eliminated by the body.

Another advantage of the present invention is that the incorporation of functionalization into the polymer provides for the enhanced control over the physical characteristics of the polymer, in particular, polymer degradation. The ability to control these physical characteristics offers enhanced control over the hydrophilic—lipophilic balance (HLB) in a given polymer system, which can affect the rate of water uptake, which is one of the parameters that plays a role in the trade off between bulk degradation and surface degradation of a polymer.

Also, control over functionalization provides for improved polymer processing and use in a greater diversity of potential applications. The functionalized polymers of the present invention can be processed to form particulates for delivery of active agents in pharmaceutical applications. Certain functionalized polymers with unsaturated substituents can be crosslinked, even in vivo, to form polymer networks for high strength applications. Other functionalized polymers can be synthesized to form thermoresponsive polymer gels, so that a liquid polymer at room temperature becomes a gel or a solid once it is injected into a human or animal body, facilitating the ease of injection.

BRIEF DESCRIPTION OF THE FIGURES

The present invention is described with reference to the accompanying figures.

DETAILED DESCRIPTION OF THE PREFERRED EMBODIMENTS

Overview

To ensure clarity of the description that follows, the following definitions are provided:

The polymers of the present invention are preferably degradable. By "degradable" is meant that the material should be susceptible to degradation or destruction under certain conditions. For medical applications, the polymers are preferably biodegradable and biocompatible. By "biodegradable" is meant a material that should degrade by bodily processes or under conditions present in the body to products readily disposable by the body and should not accumulate in the body. The products of the biodegradation should also be biocompatible with the body. By "biocompatible" is meant not toxic to the body, is pharmaceutically acceptable, is not carcinogenic, and does not significantly induce inflammation in body tissues. As used herein, "body" preferably refers to the human body, but it should be understood that body can also refer to a non-human animal body.

Polymerization according to the methods of the present invention involves the combination of "monomers" or discreet chemical units. Monomers react with each other or with one or more other, different monomers to form a higher molecular weight compound called a "polymer." Polymerization of a single type of monomer generates a "homopolymer," that is, a polymer having only one type of building block unit in the polymer backbone. Polymerization of more than one type of monomer generates a "copolymer," that is, a polymer having more than one type of building block unit in the polymer backbone. Copolymerization requires the presence of at least two different monomers.

Polymers of the Present Invention

Figure 1:
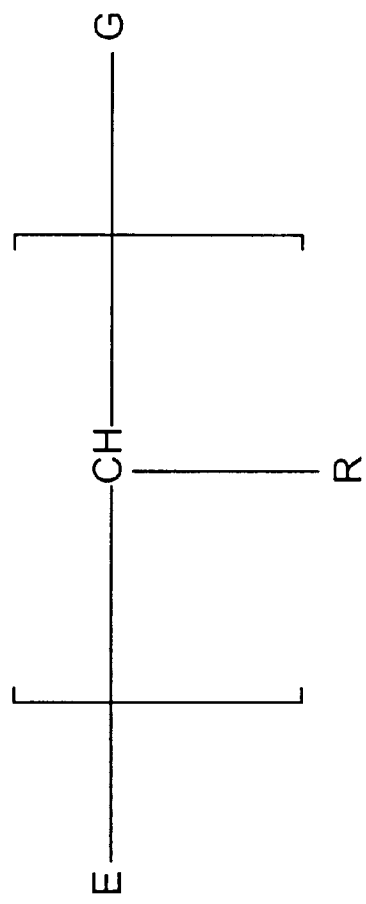
FIG. 1 is a representation of the structure of the functionalized epoxides of the present invention.

Polymerization of functionalized epoxides:

a. Synthesis of functionalized epoxides:

In one aspect, the present invention involves the synthesis of functionalized epoxides. These functionalized epoxide monomers can be viewed as having the structure E—CHR—G. In this structural representation, E represents the epoxide moiety itself, i.e.,

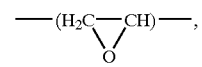

the three-membered cyclic ether structure typical of epoxides. R represents hydrogen or any alkyl group. G represents a derivatizable group. The derivatizable group can be any functional group capable of bonding to the (E—CHR)— moiety and can contain a wide variety of functionality. Such derivatizable groups can also include a degradable moiety, i.e., one that is susceptible to decomposition under appropriate conditions, such as neutral, acid or base hydrolysis. A representation of the functionalized epoxides of the present invention are shown in FIG. 1.

Specific examples of the derivatizable or derivatized groups include, but are not limited, to the following: alkyl groups or chains, esters, ethers, sulfonates, carbonates, amino carbonates, carbamates, amides, imides, anhydrides, peptides, lipids, cationic charge carriers (e.g., ammonium salts), anionic charge carriers (e.g., carboxylic acid, sulfonic acid, phosphoric acid), pluronics, PEG, PEO, PPO, urethanes, fatty acids, fatty alcohols, cholesterol, N,N alkyl amines (e.g., N,N diethyl amine), sugars, and polysaccharides. The derivatizable or derivatized group can also contain unsaturation. Preferably, the derivatizable group includes ester functionality.

In a preferred embodiment, the starting material used to synthesize the wide variety of functionalized epoxides of the present invention is 2-methyl-4-pentenoic acid, abbreviated MPA. The different functionality that can be introduced into the MPA starting material encompasses any functionality contemplated by one of ordinary skill in the art. As an example, the starting material, MPA, can be functionalized by first forming any corresponding ester of the carboxylic acid group of MPA. That ester is abbreviated X-MP, where X is the functionality introduced through the esterification reaction. The ester, X-MP, is then treated with an oxidizing agent to form the corresponding epoxide, abbreviated X-MPO, or in other words, the oxide of the ester. This sequence is shown below.

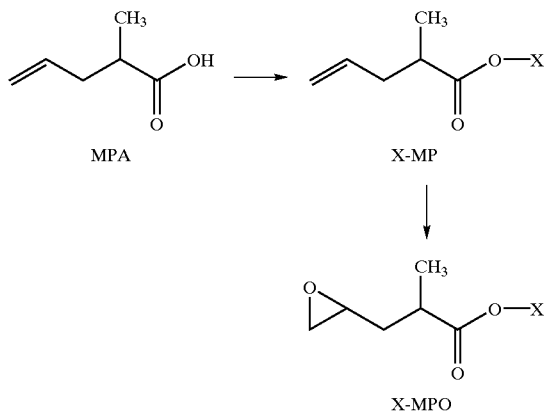

Figure 2:
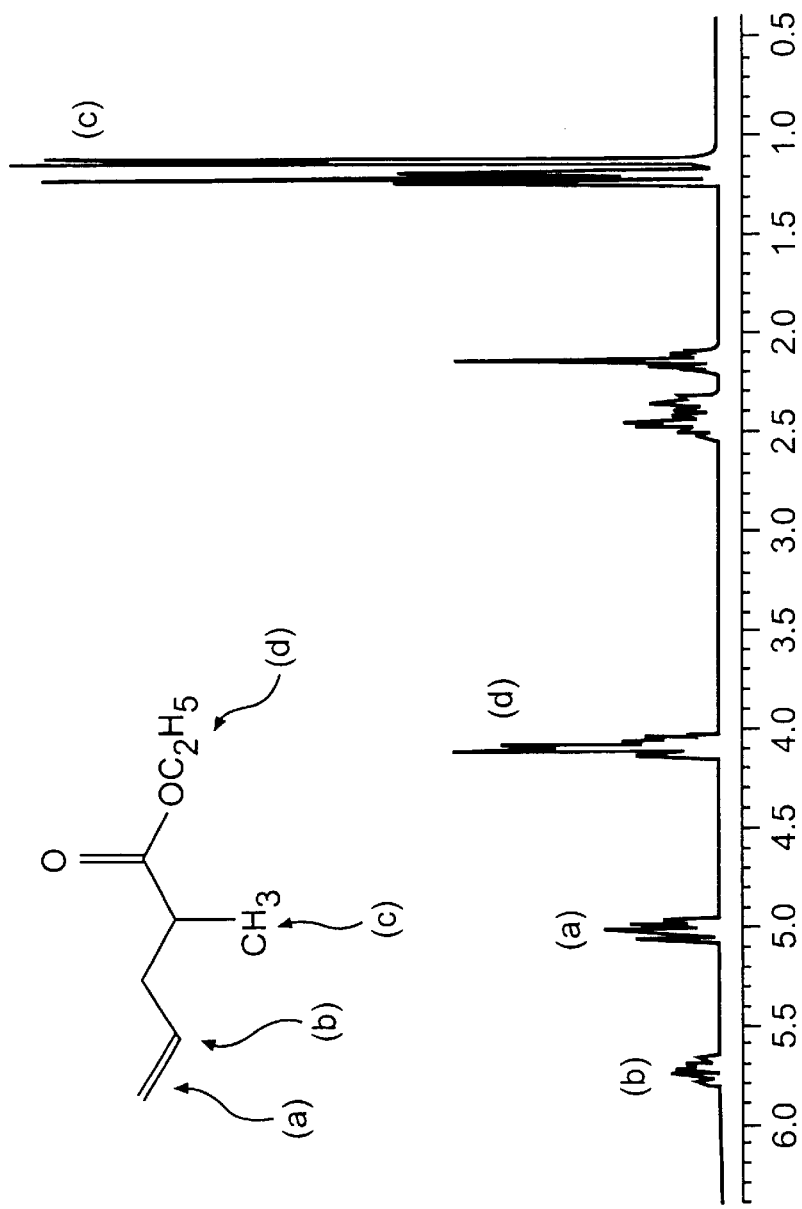
FIG. 2 is the proton ($^1$H) Nuclear Magnetic Resonance (NMR) spectrum of ethyl-2-methyl-pent-4-enoate (EMP).
Figure 3:
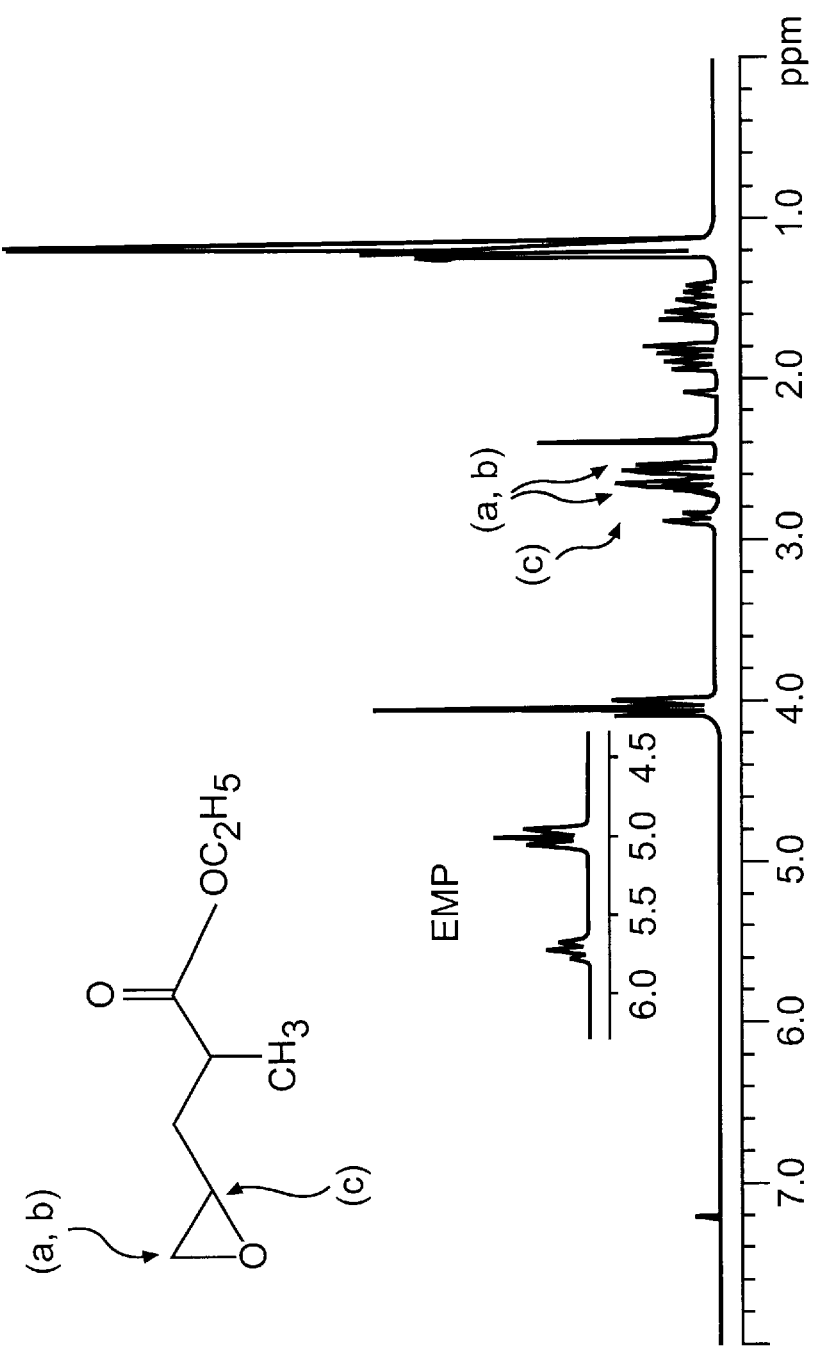
FIG. 3 is the proton ($^1$H) Nuclear Magnetic Resonance (NMR) spectrum of the epoxide, ethyl-2-methyl-pent-4-enoate oxide (EMPO).

In particular, a preferred functionalized epoxide having an ester functionality in the derivatizable group is the epoxide of the ethyl ester of the starting material, MPA. That epoxide is ethyl-2-methyl-pent-4-enoate oxide, abbreviated EMPO. A typical procedure for the synthesis of the epoxide EMPO is as follows:

A two-liter three neck flask equipped with a magnetic stirrer and a 250 ml dropping funnel was first charged with 600 ml of 0.2 M sodium phosphate buffer (pH 7). To this solution, 20 grams (140.64 mmoles, 17.5 ml) of ethyl-2-methyl-pent-4-enoate (EMP) (Aldrich), dissolved in 400 ml of analytical grade acetone (Mallinckrodt), was added. The $^1$H NMR spectrum of ethyl-2-methyl-pent-4-enoate (EMP) is shown in FIG. 2. This mixture was then cooled down using an ice-water bath. To this cooled mixture, 108 grams (175.8 mmoles) of Oxone® (DuPont) dissolved in 400 ml of distilled deionized water was added dropwise using a dropping funnel over a period of 45 minutes to an hour. Throughout the addition, the pH was maintained in and around neutral (pH 7) by adding 8 N aqueous sodium hydroxide. Upon completion of addition of Oxone®, the pH was periodically monitored and maintained at neutral pH until no appreciable change was observed (approximately 2 hours after Oxone(® addition). This reaction mixture was stirred for an additional 18 hours to ensure complete epoxidation of EMP. After 18 hours, a white precipitate of sulfates was obtained. The reaction mixture was filtered to remove the precipitate. The acetone from the reaction mixture including the precipitate was removed under reduced pressure to ensure efficient extraction of the epoxide in a later step. This reduced reaction mixture was then extracted with 8×25 ml of methylene chloride. The combined methylene chloride phase was washed once with 200 ml of brine and then filtered and dried over anhydrous sodium sulfate. The removal of methylene chloride under reduced pressure yielded a pale yellow liquid, which by proton-NMR was identified as devoid of starting material. Any residual impurity was removed by flash chromatography on silica support using hexane as the eluent. The yield of the purified product ranged from 85–95%. The $^1$H NMR spectrum of the epoxide of ethyl-2-methyl-pent-4-enoate (EMPO) is shown in FIG. 3.

Figure 4:
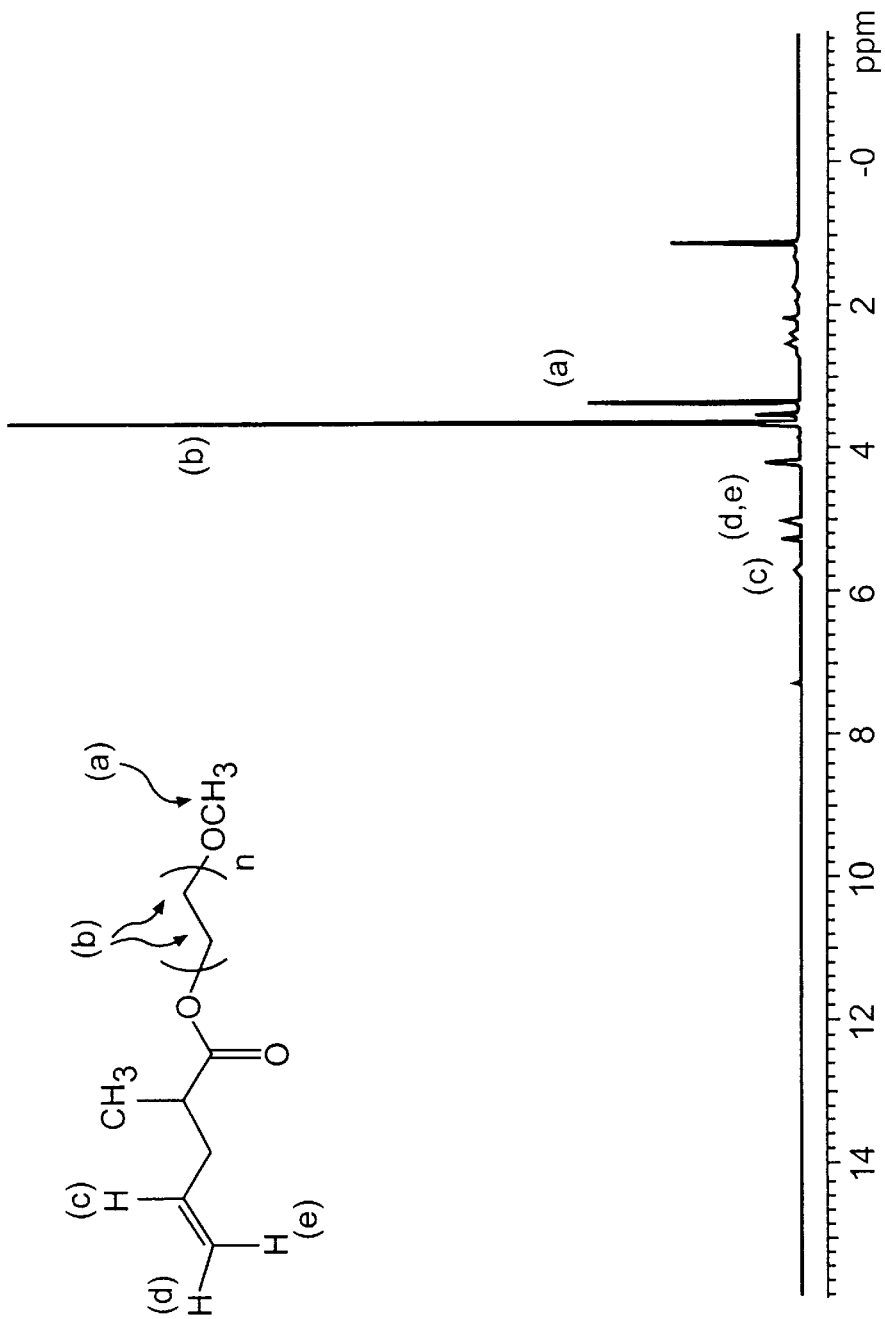
FIG. 4 is the proton ($^1$H) Nuclear Magnetic Resonance (NMR) spectrum of monomethyl polyoxyethylene-2-methyl-pent-4-enoate (PEG-MP).
Figure 5:
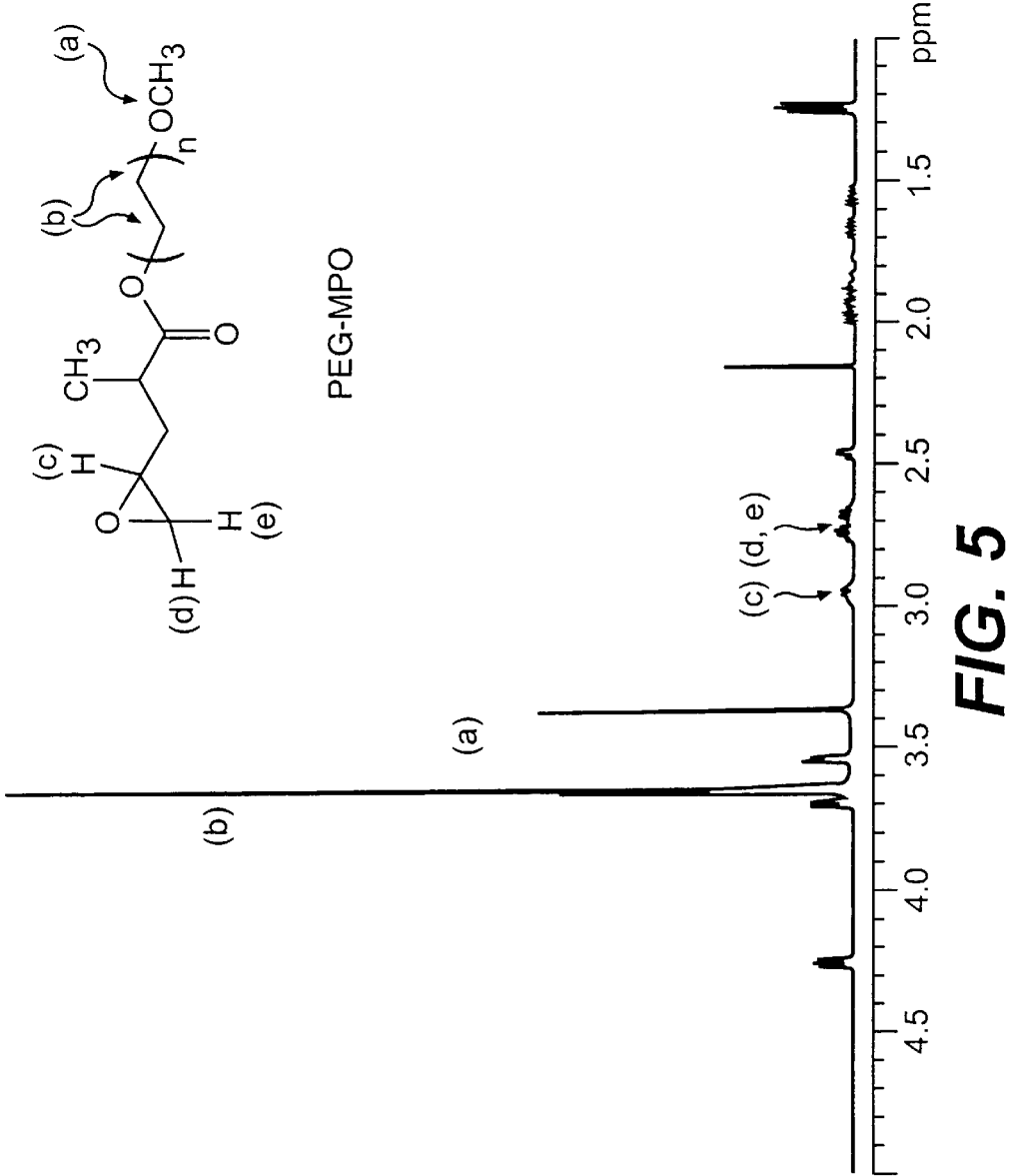
FIG. 5 is the proton ($^1$H) Nuclear Magnetic Resonance (NMR) spectrum of the epoxide, monomethyl polyoxyethylene-2-methyl-pent-4-enoate oxide (PEG-MPO).

Another example of a preferred functionalized epoxide containing ester functionality is the epoxide of the ester formed by coupling MPA and monomethyl polyethylene glycol. That epoxide is monomethyl polyoxyethylene-2-methyl-pent-4-enoate oxide, abbreviated PEG-MPO. PEG-MPO was synthesized by first synthesizing the PEG-substituted ester, monomethyl polyoxyethylene-2-methyl-pent-4-enoate (PEG-MP) by a coupling reaction of the starting material, 2-methyl-pent-4-enoic acid (MPA), with monomethyl polyethylene glycol (PEG) in the presence of DCC/DMAP/CH$_2$Cl$_2$, wherein DCC is dicyclohexylcarbodiimide, and DMAP is 4-(dimethylamino)pyridine. The $^1$H NMR spectrum of monomethyl polyoxyethylene-2-methyl-pent-4-enoate (PEG-MP) is shown in FIG. 4. Next, using an analogous procedure described above for forming the epoxide of EMP, the PEG-substituted ester was treated with Oxone® to form the epoxide monomethyl polyoxyethylene-2-methyl-pent-4-enoate oxide, PEG-MPO. The $^1$H NMR spectrum of ethyl-2-methyl-pent-4-enoate oxide (EMPO) is shown in FIG. 5.

In analogous reactions, polyethylene oxide (PEO), polypropylene oxide (PPO), or any alcohol can be reacted with MPA to form the corresponding substituted MP ester, the product of which in turn can be treated with Oxone® to form the corresponding epoxide.

Figure 6:
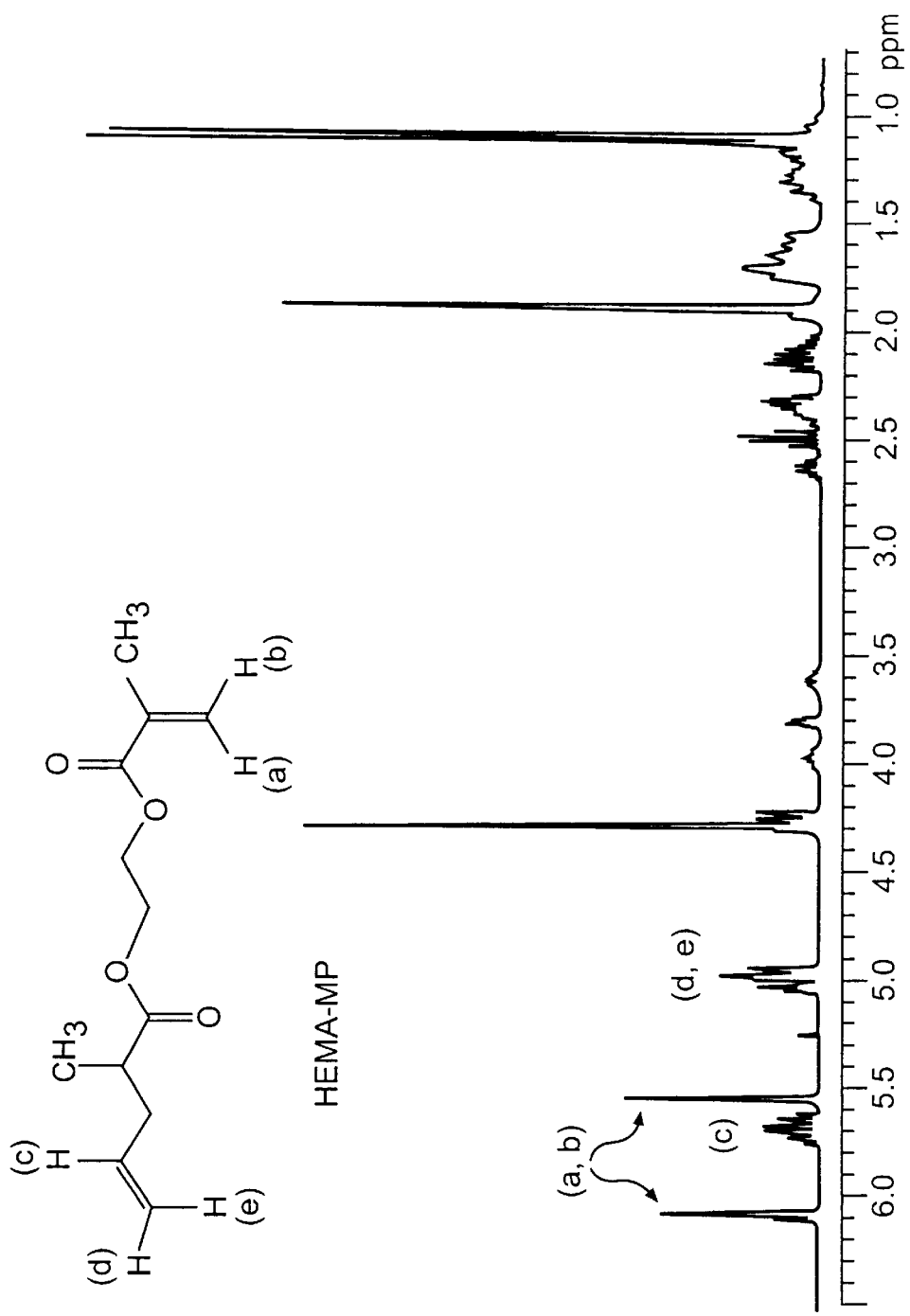
FIG. 6 is the proton ($^1$H) Nuclear Magnetic Resonance (NMR) spectrum of (2'-methacryloyl)ethyl-2-methyl-pent-4-enoate (HEMA-MP).
Figure 7:
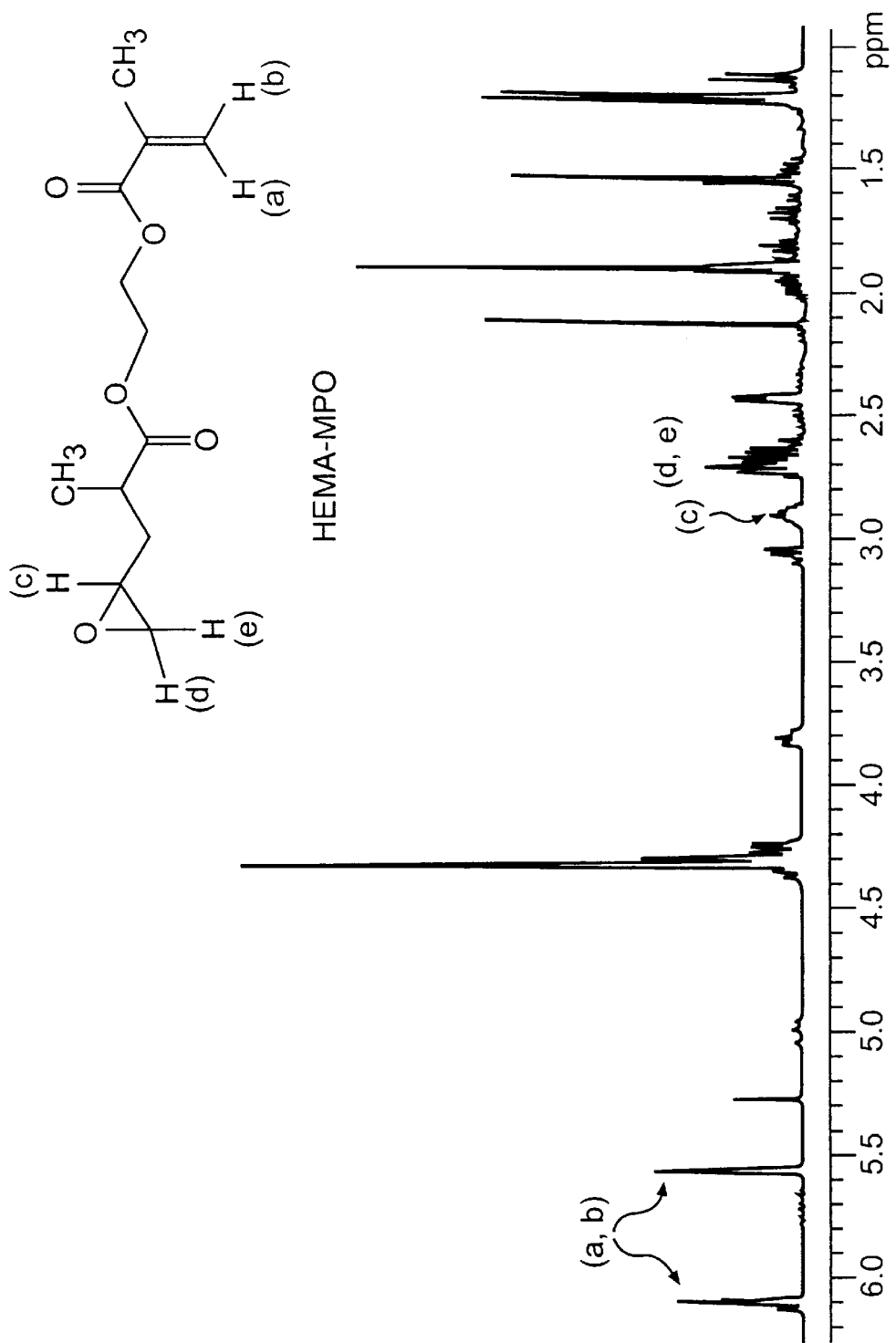
FIG. 7 is the proton ($^1$H) Nuclear Magnetic Resonance (NMR) spectrum of the epoxide, (2'-methacryloyl)ethyl-2-methyl-pent-4-enoate oxide (HEMA-MPO).

In another preffered embodiment, the derivatizable group includes unsaturated functionality in addition to an ester group, in particular, unsaturated functionality capable of crosslinking under appropriate conditions. The general preferred structure has an epoxide at one end and a photopolymerizable group on the other end and a degradable linkage in between. An example of a functionalized epoxide having unsaturated functionality in the derivatizable group is the epoxide of the ester formed by the esterification reaction of an unsaturated alcohol and the carboxylic acid group of the starting material, MPA. In particular, hydroxyethyl methacrylate (HEMA) was coupled with the starting material, MPA, in the presence of DCC/DMAP/CH$_2$Cl$_2$ to form (2'-methacryloyl)ethyl-2-methyl-pent-4-enoate, abbreviated HEMA-MP. The $^1$H NMR spectrum of (2'-methacryloyl) ethyl-2-methyl-pent-4-enoate (HEMA-MP) is shown in FIG. 6. This ester in turn was oxidized by treatment with Oxone® to form the corresponding epoxide, (2'-methacryloyl)ethyl-2-methyl-pent-4-enoate oxide, abbreviated HEMA-MPO. The $^1$H NMR spectrum of (2'-methacryloyl)ethyl-2-methyl-pent-4-enoate oxide (HEMA-MPO) is shown in FIG. 7. Importantly, the epoxidation reaction formed an epoxide exclusively on the unsaturation in the MP portion of the molecule and not on the unsaturation in the HEMA portion of the molecule. Thus, this functionalized epoxide contains epoxide functionality for use in polymerization reactions, ester functionality for degradability characteristics, and unsaturated functionality for potential use in crosslinking reactions.

Using similar procedures, a wide variety of functionalized epoxides may be synthesized. For example, ethyl-2-methyl-pent-4-enoate (EMP) can be functionalized and then reacted with Oxone® as described above to form a functionalized epoxide. In particular, EMP was reacted with lithium diisopropylamide (LDA), followed by treatment with trimethylchlorosilane (TMSCl) to form the corresponding (trimethylsilyl)-protected enolate anion. Subsequent treatment of that species with ClSiMe$_3$SO$_3$ and sodium bicarbonate yielded the corresponding SO$_3$Na-substituted salt of EMP. This procedure is described in an article by J -K. Liu and G. E. Wnek in *Macromolecules*, entitled "Reactions of Silyl Ketene Acetal Functionalized Polysiloxanes: Synthesis of Sulfonated Polysiloxanes," vol. 27, 1994, p. 4080, incorporated herein by reference.

b. Homopolymerization of functionalized epoxides:

In a further embodiment of the invention, the above-described functionalized epoxides are polymerized by ring-opening polymerization. The resulting homopolymer is comprised of repeating ethoxy ether units, i.e., the ring-opened

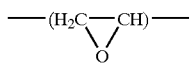

epoxide moiety, with the functionalized side chain of the original functionalized epoxide, i.e., the derivatizable group G, appended to one of the carbon atoms of each of the repeating ethoxy ether units. Because ring-opening polymerization of the functionalized epoxides in the present invention occurs under mild conditions as described in more detail below, a wide variety of structural groups can be appended to the polymer backbone and will in fact remain appended after polymerization. Thus, the derivatizable groups G of the original epoxide monomers can be virtually anything capable of bonding to the original epoxide moiety, E—CHR— as described above.

Figure 8:
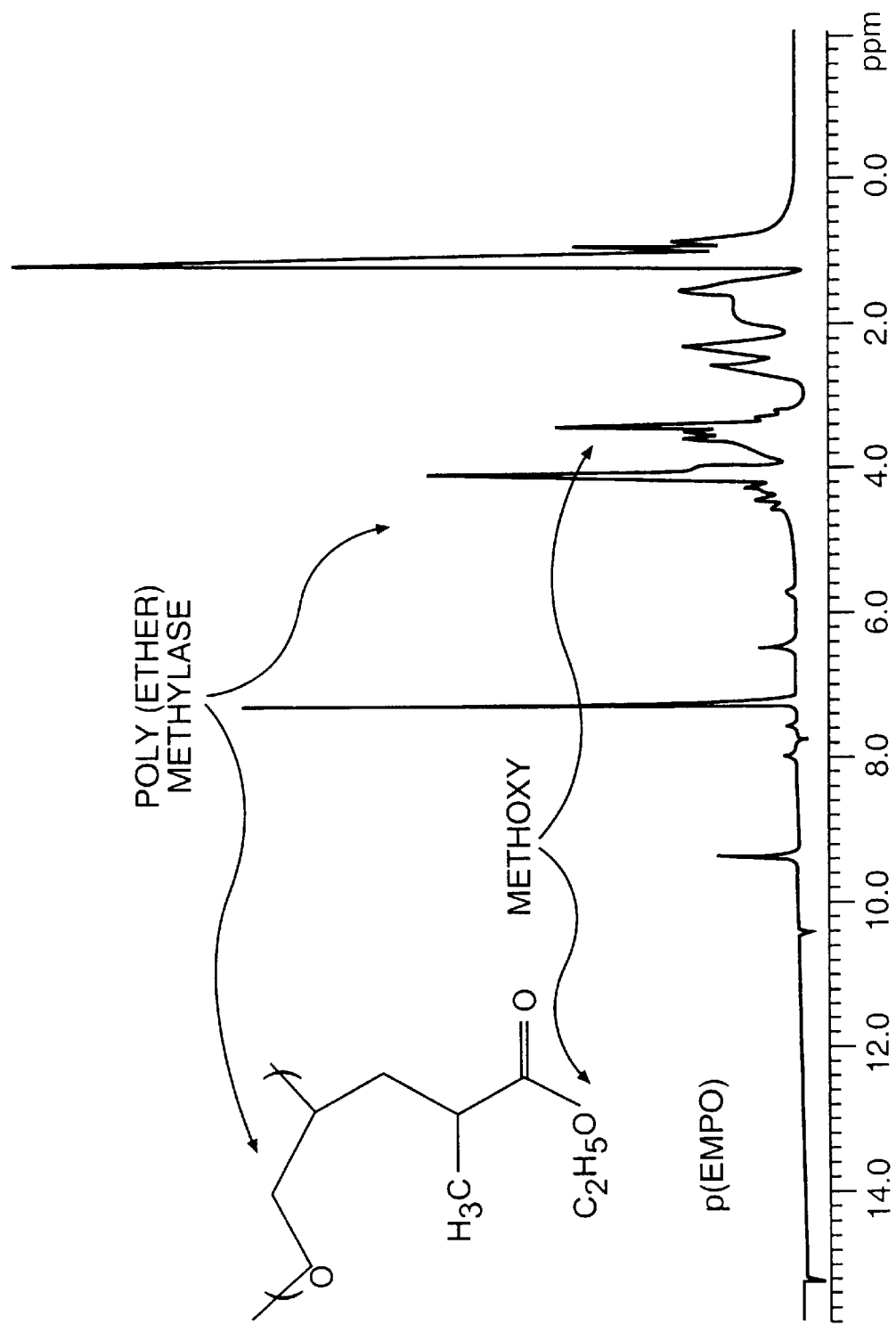
FIG. 8 is the proton ($^1$H) Nuclear Magnetic Resonance (NMR) spectrum of the polymer of the epoxide, ethyl-2-methyl-pent-4-enoate oxide (EMPO), abbreviated poly (EMPO).

In one preferred embodiment, the functionalized epoxide used for polymerization is epoxide ethyl-2-methyl-pent-4-enoate oxide (EMPO), and the resulting polymer is poly (EMPO). The $^1$H NMR spectrum of the polymer of the epoxide of ethyl-2-methyl-pent-4-enoate oxide (poly (EMPO)) is shown in FIG. 8. In another preferred embodiment, the functionalized epoxide used for polymerization is the epoxide monomethyl polyoxyethylene 2-methyl-pent-4-enoate oxide (PEG-MPO), and the resulting polymer is poly(PEG-MPO). In another preferred embodiment, the functionalized epoxide is (2'-methacryloyl) ethyl-2-methyl-pent-4-enoate oxide (HEMA-MPO), and the resulting polymer is poly (HEMA-MPO).

In addition to the above-described synthesis of functionalized epoxides before subsequent polymerization to form the corresponding homopolymer, the present invention contemplates functionalizing the side chain of the epoxide after the epoxide has been ring-opened and the polymer formed.

The ring-opening polymerization of the functionalized epoxides to form homopolymers of the present invention occurs under mild conditions. Generally, the polymerizations occur at relatively low temperatures, that is, less than about 120° C., preferably less than about 100° C., and more preferably less than about 90° C. Most preferably, the formation of the homopolymers occurs in the temperature range from about 50 to about 75° C. In addition, the polymerizations occur at pressures ranging from about 1 millitorr to about atmospheric pressure. Preferably, the pressure used for homopolymerization of functionalized epoxides is about atmospheric pressure. Depending on the particular functionalized epoxide being polymerized, the polymerization reaction takes from about one hour up to about two or three days.

These mild conditions for ring-opening polymerization of the functionalized epoxides just described results from using an appropriate initiating system. The initiating system of the present invention comprises any system capable of initiating cationic ring-opening polymerization. In particular, any initiating system capable of initiating cationic ring-opening polymerization of cyclic esters and ethers can be used to ring-open the functionalized epoxides of the present invention.

In general, organometallic compounds are the preferred initiating systems of the present invention. Examples of such organometallic compounds, include, but are not limited to, tin-, iron-, platinum-, titanium-, copper-, and zinc-containing compounds, and cationic photoinitiation salts, including sulfonium salts, phosphonium salts, and iodinium salts. Examples of particular organometallic compounds used in the initiating systems of the present invention include titanium alkoxides, copper or iron phthalocyanines, zinc acetate, organoplatinum compounds, and organotin compounds, e.g., alkyltin ester compounds such as dibutyl tin diacetate, dibutyl tin dilaurate, dibutyl tin dioctoate and the like, halogen-containing organic tin compounds such as acetylacetonanto complex of tin dibromide, and tin orthoester compounds and the like. In a more preferred embodiment, the initiating system comprises a stannous, i.e., +2 oxidation state, organotin compound. Most preferably, the organotin compound is stannous (2-ethyl-hexanoate), also known as stannous (octoate).

Additional compounds that can be used in the initiating systems of the present invention are cationic photoinitiators, such as onium salt photocatalysts as disclosed in U.S. Pat. No. 5,639,413, issued to Crivello, incorporated herein by reference. More specifically, those onium salt photocatalysts are selected from the group consisting of diaryliodonium salts, triarylsulfonium salts, aryldiazonium salts, ferrocenium salts, diarylsulfoxonoium salts, diarlyiodoxonium salts, triarylsulfoxonium salts, dialkylphenacylsulfonium salts, dialkylhydroxyphenylsulfonium salts, phenacyltri-arylphosphonium salts, and phenacyl salts of heterocyclic nitrogen-containing compounds. The counteranion for these cationic photoinitiators can take various forms, for example, $PF_6^-$, $BF_4^-$, $CF_3SO_3^-$ and $(C_6F_6)_4B^-$ anions.

The initiating system can also include an alcohol-containing species. Any species that contains one or more hydroxy, i.e., R—OH, groups can be used as the alcohol-containing species in the initiating system. Examples of suitable alcohol-containing species are short chain alcohols (e.g., ethanol, propanol, and the like), alkane diols (e.g., butanediol, hexanediol, tetraethylene glycol (TEG), and the like), alcohols with unsaturation (e.g., alkenols), long chain alcohols (e.g., alcohols based on polyethylene glycol (PEG), also known as polyethylene oxide (PEO), polypropylene oxide (PPO), and the like), pluronics, fatty alcohols, cholesterol, and polyols (dendrimers, glycerol, polyvinylalcohol, and the like). The present invention also contemplates the situation where the alcohol-containing species in the initiating system comprises alcohol-containing photopolymerizable groups. An example of such a photopolymerizable group is one that contains unsaturation as well as a hydroxy group, for example, hydroxyethylmethacrylate (HEMA).

A preferred initiating system of the present invention comprises an organotin compound and an alcohol containing species. Organotin compounds where the tin atom is in the stannous, i.e., +2, oxidation state are more preferred. Any alcohol containing species can be used in the initiating system as described above. In a most preferred embodiment, the initiating system comprises an organotin catalyst, for example, stannous (2-ethyl-hexanoate), and an alcohol-containing species, for example, tetraethyleneglycol (TEG).

The following is a detailed description of the preparation of the preferred initiating system of the present invention. A stock solution of the preferred initiating system was made by dissolving 436.16 mg of stannous (2-ethyl hexanoate) and 98.24 mg tetraethyleneglycol (TEG) in 2 ml of methylene chloride. For each polymerization reaction performed in a 10 ml glass ampoule containing 12.66 mmole of monomer molecules, 135 μl of the stock solution of the initiating system was used, i.e., 27.26 mg of stannous (2-ethyl hexanoate) and 6.14 mg TEG were used per polymerization. The theoretical yield is monomer chain lengths of n=100 on each side of TEG. If higher molecular weight is desired, then the initiator stock solution concentration can be reduced as desired.

A typical homopolymerization procedure is as follows:

The functionalized epoxide monomer was placed in a 10 ml glass ampoule equipped with a stirrer and then heated in an oil bath to approximately 70° C. To this monomer solution, the initiating system comprising tetraethylene glycol (TEG) and stannous (2-ethyl hexanoate) was added as a solution in methylene chloride or ethyl acetate. Upon addition of the initiating system, the polymerization mixture was maintained at 68° C. for 19–24 hours. At the end of the polymerization period, the polymerization was quenched with methanol in a solution with methylene chloride (0.5 ml methanol+0.5 ml methylene chloride). The polymer was dissolved in 10 ml of methylene chloride and then isolated by precipitation in hexanes (400–500 ml). The polymer that was isolated was an oil, and was soluble in alcohol solvents, acetone, and chlorinated hydrocarbons. The typical degree of polymerization was approximately 6 to 20 repeat units.

It should be appreciated that the present invention also involves the synthesis of copolymers derived from the functionalized epoxides, wherein two or more epoxides with different functionality, i.e., different derivatizable groups G, can be polymerized together. Analogous initiating systems as described above for the homopolymerizations can be used for these copolymerization reactions.

2. Polymerization of functionalized epoxides and cyclic esters:

In still another embodiment of the invention, ring-opening polymerization is used to copolymerize the above-described functionalized epoxides with cyclic esters. The resulting copolymer is comprised of both the ring-opened functionalized epoxide, in the form of ethoxy ether units, and the ring-opened cyclic ester, in the form of ester units.

The functionalized epoxide monomer can be as described above and the functionality is retained in the resulting copolymer because of the mild copolymerization reaction conditions. In addition to the above-described synthesis of functionalized epoxides before subsequent polymerization to form a copolymer with cyclic esters, the present invention contemplates functionalizing the side chain of the epoxide after the epoxide has been ring-opened and the copolymer with the ring-opened cyclic ester has been formed.

The cyclic ester monomer can be any cyclic ester susceptible to cationic ring-opening polymerization. Examples of cyclic esters containing a single ester moiety, also called lactones, include propiolactone (four-membered ring), valerolactone (six-membered ring), caprolactone (seven-membered ring), and pentadecalactone (fifteen-membered ring). Examples of cyclic esters containing a single ester moiety, but also other nonaliphatic functionality in the ring include, for example, 1,4-dioxan-2-one, wherein the other ring functionality is an ether linkage. Cyclic esters that contain two ester moieties in a single six-membered-ringed structure and have been used as monomers in ring-opening polymerization include lactide and glycolide. Preferably, the cyclic ester used in the present invention is either lactide, glycolide, caprolactone, 1,4-dioxan-2-one, or a cyclic carbonate.

As described previously, lactic acid- and glycolic acid-based polymers are typically obtained by ring-opening polymerization of the corresponding diester dimers, lactide and glycolide, respectively, themselves. The resulting polymers of these ring-opening polymerization reactions are poly (lactic acid), also known as poly(lactide), abbreviated PLA and poly(glycolic acid), also known as poly(glycolide), abbreviated PGA. Copolymers incorporating both monomers are also available and are termed poly(lactide-co-glycolides) abbreviated PLGA and poly(glycolide-co-lactides) abbreviated PGLA, collectively PLGs. U.S. Pat. No. 5,650,173, previously incorporated herein by reference, describes examples of these commercially available polymers and copolymers based on lactic acid and glycolic acid.

Copolymers of the functionalized epoxides described above and cyclic esters were synthesized in a manner similar to that described for the polymerization of the functionalized epoxides alone.

The ring-opening copolymerization of the functionalized epoxides of the present invention with cyclic esters occurs under mild conditions. This is due, in part, to the ability of the functionalized epoxides, which are liquids, to act as solvents for the cyclic esters, thus avoiding the need for additional solvents and higher temperatures. As with the homopolymerization reactions, the mild conditions of the present invention include temperatures less than about 120° C., preferably less than about 100° C., more preferably less than about 90° C. and most preferably from about 50 to about 75° C. The mild conditions include pressures between about 1 millitorr to about atmospheric pressure. The copolymerization reactions also take from about one hour to about two or three days to complete. These mild conditions for ring-opening copolymerization of the functionalized epoxides just described and cyclic esters results from using an initiating system. The preferred initiating system for the copolymerization reactions is the same as that for the polymerization of the functionalized epoxides alone as described above. However, other suitable initiating systems can be used as well.

A typical procedure for the copolymerization of EMPO and lactide is shown and described as follows:

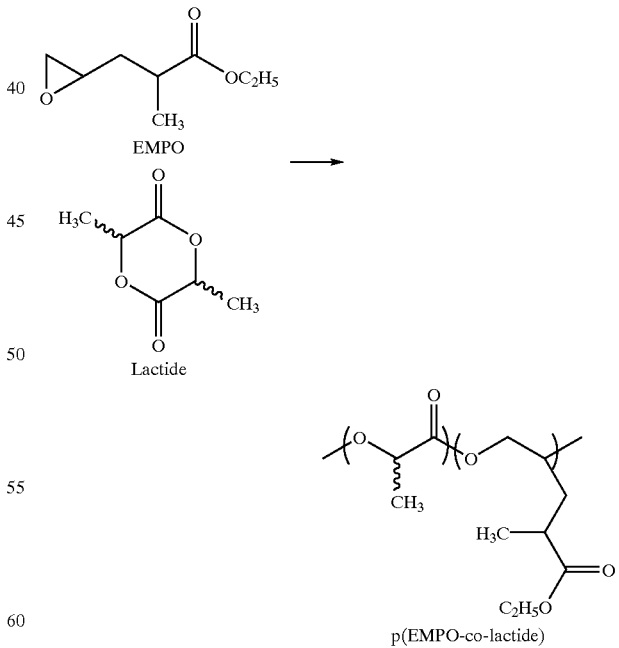

Figure 9:
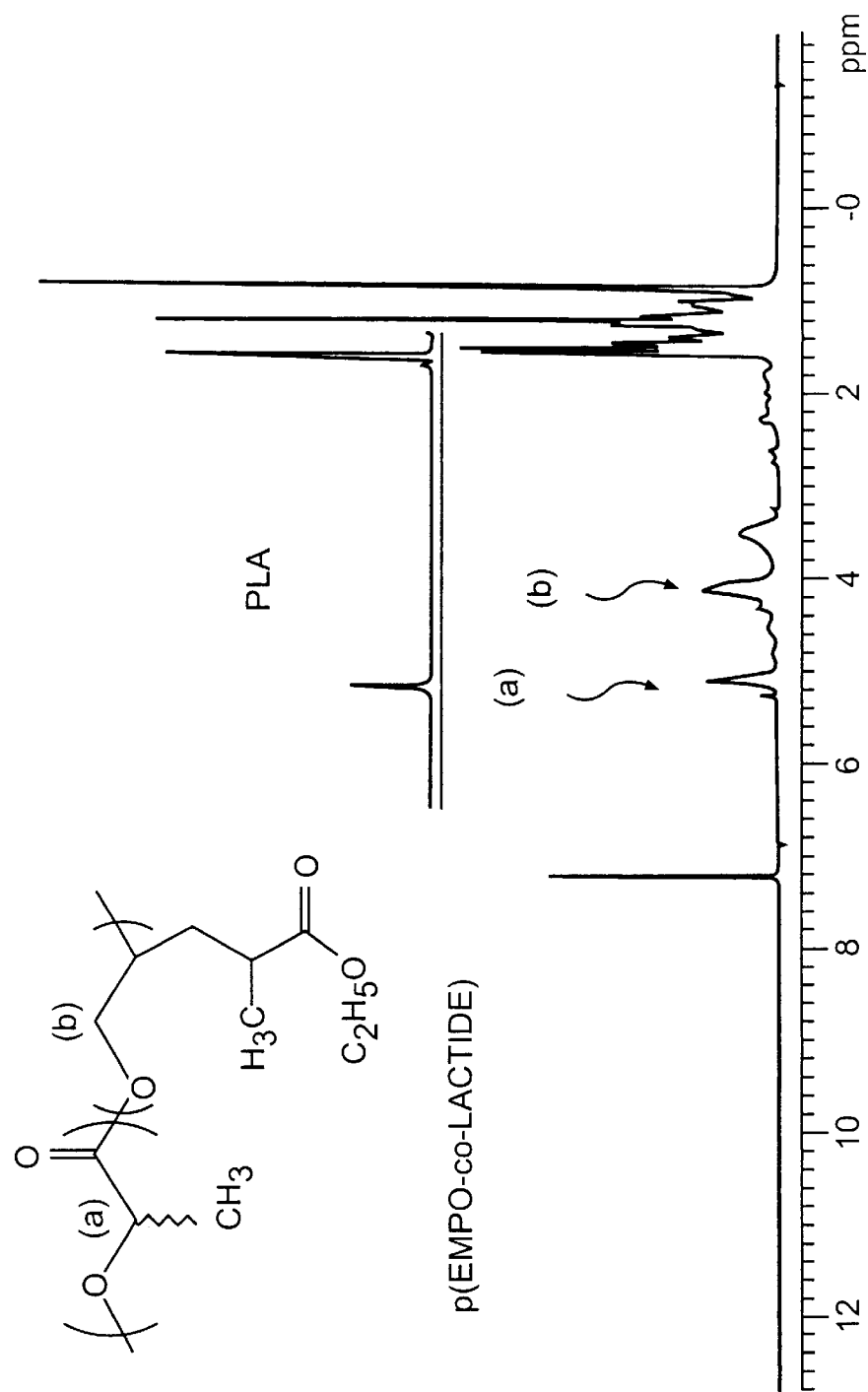
FIG. 9 is the proton ($^1$H) Nuclear Magnetic Resonance (NMR) spectrum of the copolymer of the epoxide, ethyl-2-methyl-pent-4-enoate oxide (EMPO), and L-lactide, abbreviated poly(L-lactide-co-EMPO) or poly(EMPO-co-L-lactide).

The functionalized epoxide monomer (EMPO) and the cyclic ester monomer (lactide) were placed in a 10 ml glass ampoule equipped with a stirrer and then heated in an oil bath to approximately 90° C. to ensure complete dissolution of the monomers. To this solution, the initiating system comprising tetraethylene glycol (TEG) and stannous-2-ethyl hexanoate (stannous octoate) was added as a solution in methylene chloride or ethyl acetate. Upon addition of the initiating system, the polymerization mixture was cooled slowly to 68° C. over a period of 20 minutes and then maintained at that temperature for 12–24 hours. At the end of the polymerization period, the polymerization was quenched with methanol in a solution with methylene chloride (0.5 ml methanol+0.5 ml methylene chloride). The polymer was dissolved in 10 ml of methylene chloride and then isolated by precipitation in hexanes (400–500 ml). The polymer that was isolated was a white powdery solid, soluble in chlorinated hydrocarbons, acetone, and sparingly soluble in tetrahydrofuran, methanol and ethanol. The copolymer exhibited excellent film forming properties, and had glass transition temperatures ranging from 12 to 45° C. FIG. 9 is the $^1$H NMR spectrum of a copolymer of ethyl-2-methyl-pent-4-enoate oxide (EMPO) and L-lactide (poly(EMPO-co-L-lactide)).

Figure 10:
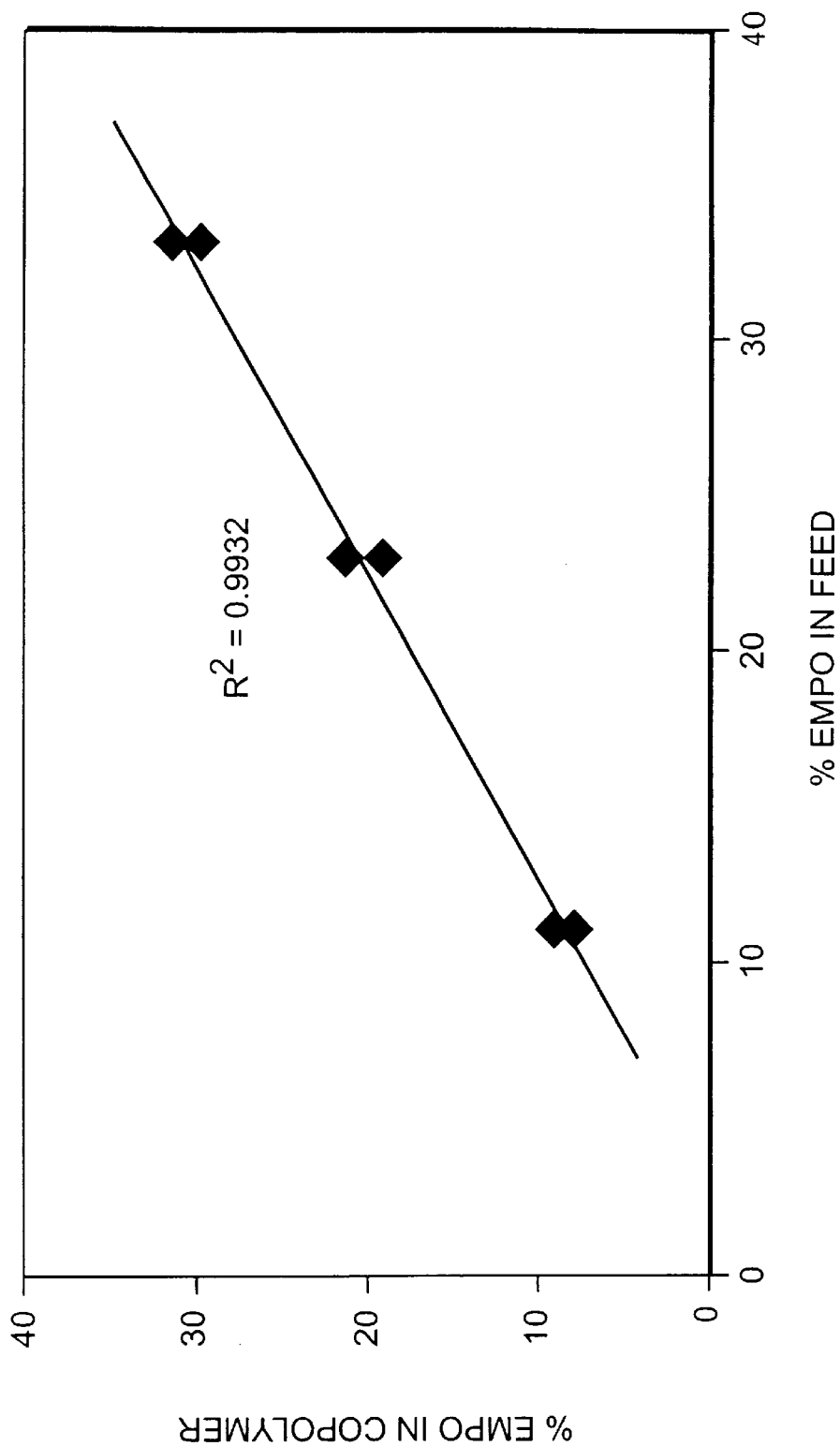
FIG. 10 is a graph showing the percentage of incorporation of the epoxide, ethyl-2-methyl-pent-4-enoate oxide (EMPO), in the copolymer with L-lactide at 68° C. as a function of percentage EMPO in the monomer feed.

FIG. 10 is a graph showing the percentage of incorporation of the ethyl-2-methyl-pent-4-enoate oxide (EMPO) in the copolymer with L-lactide at 68° C. as a function of percentage EMPO in the monomer feed. The graph shows a linear relationship between the amount of EMPO in the monomer feed stream and the amount of EMPO present in the copolymer, indicating consistent and controlled incorporation of the functionalized epoxide into the polymer backbone.

Figure 11:
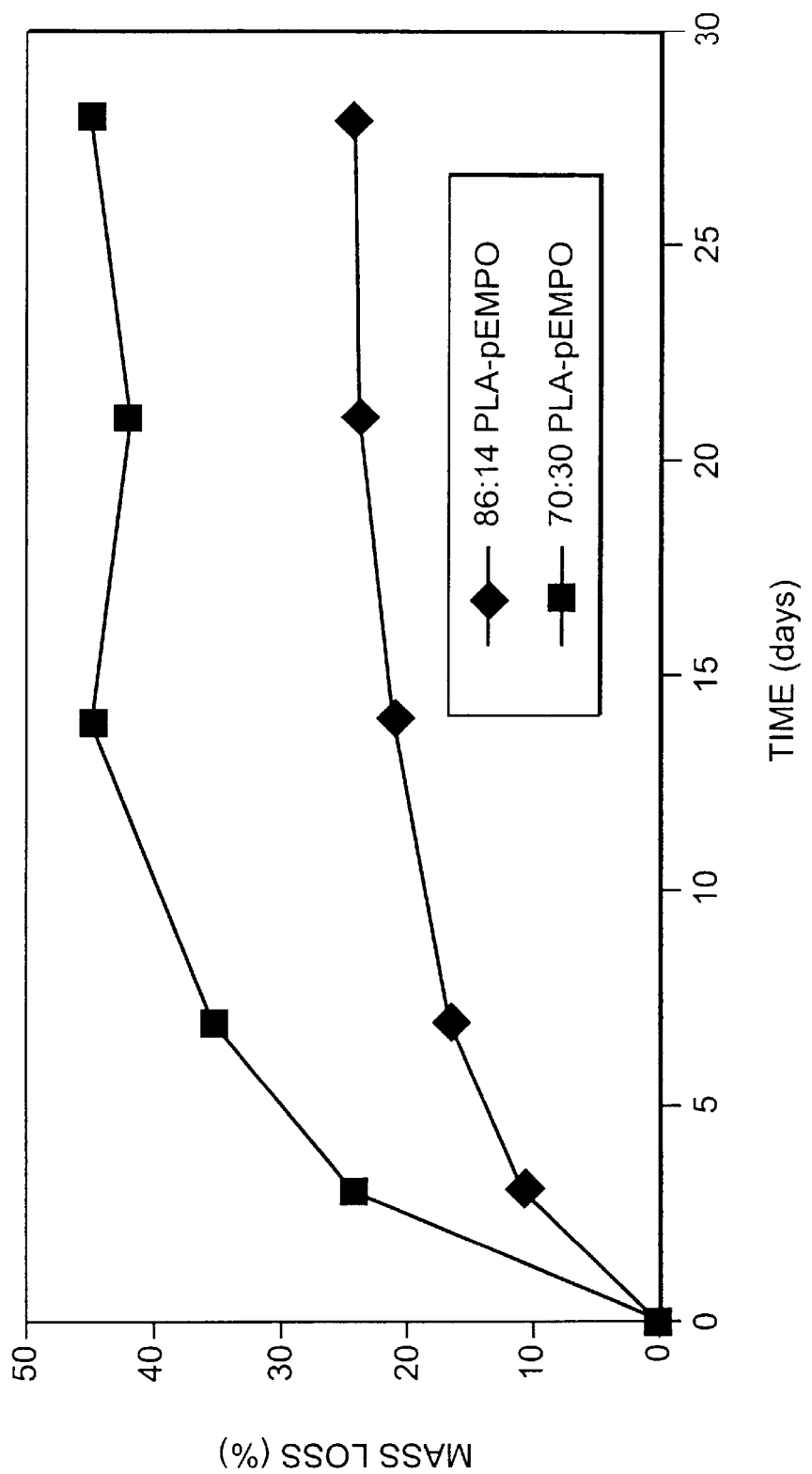
FIG. 11 is a graph showing the degradation over time of poly(EMPO-co-L-lactide) polymers containing 86% lactide and 70% lactide.

FIG. 11 is a graph showing the degradation of poly(EMPO-co-L-lactide) polymers containing 86% lactide and 70% lactide over time. For the copolymer containing 86% lactide, the graph indicates degradation of the copolymer stabilizing at approximately 20% mass loss after 15 days. For the copolymer containing 70% lactide, the graph indicates degradation of the copolymer stabilizing at approximately 45% after 15 days. This indicates that the greater amount of EMPO present in the copolymer, the greater amount of copolymer degradation to be expected in the same period of time. This also clearly demonstrates the importance of introducing functionalization into degradable polymers and the effect that such incorporation has on the degradation of the copolymer. It also indicates degradation characteristics favorable for drug delivery applications.

Figure 12:
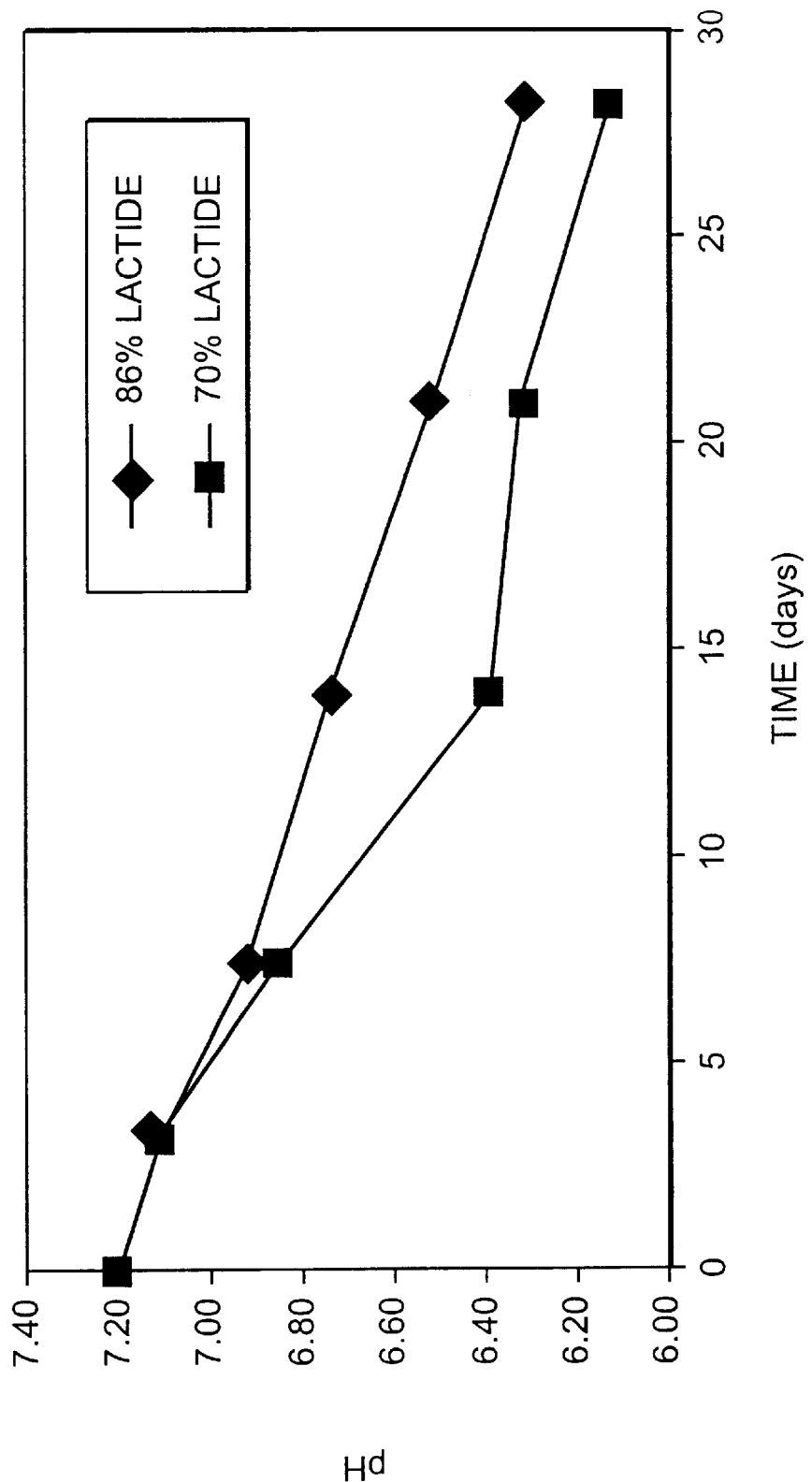
FIG. 12 is a graph showing the changes in pH of a HEPES buffer solution over time during degradation of poly(EMPO-co-L-lactide) polymers containing 86% lactide and 70% lactide.

FIG. 12 is a graph showing the changes in pH of a 50 mM HEPES buffer solution during degradation of poly(EMPO-co-L-lactide) polymers containing 86% lactide and 70% lactide over time. The graph shows a steady linear decline in pH from 7.20 to 6.20 over a period of 30 days, regardless of the amount of lactide present in the copolymer, showing a moderate change in acidity. This is in contrast to the degradation of PLA, PLG, and PLGs, which can generate an increase in acidity of up to three units, i.e., approximately pH 4, under similar conditions.

Figure 13:
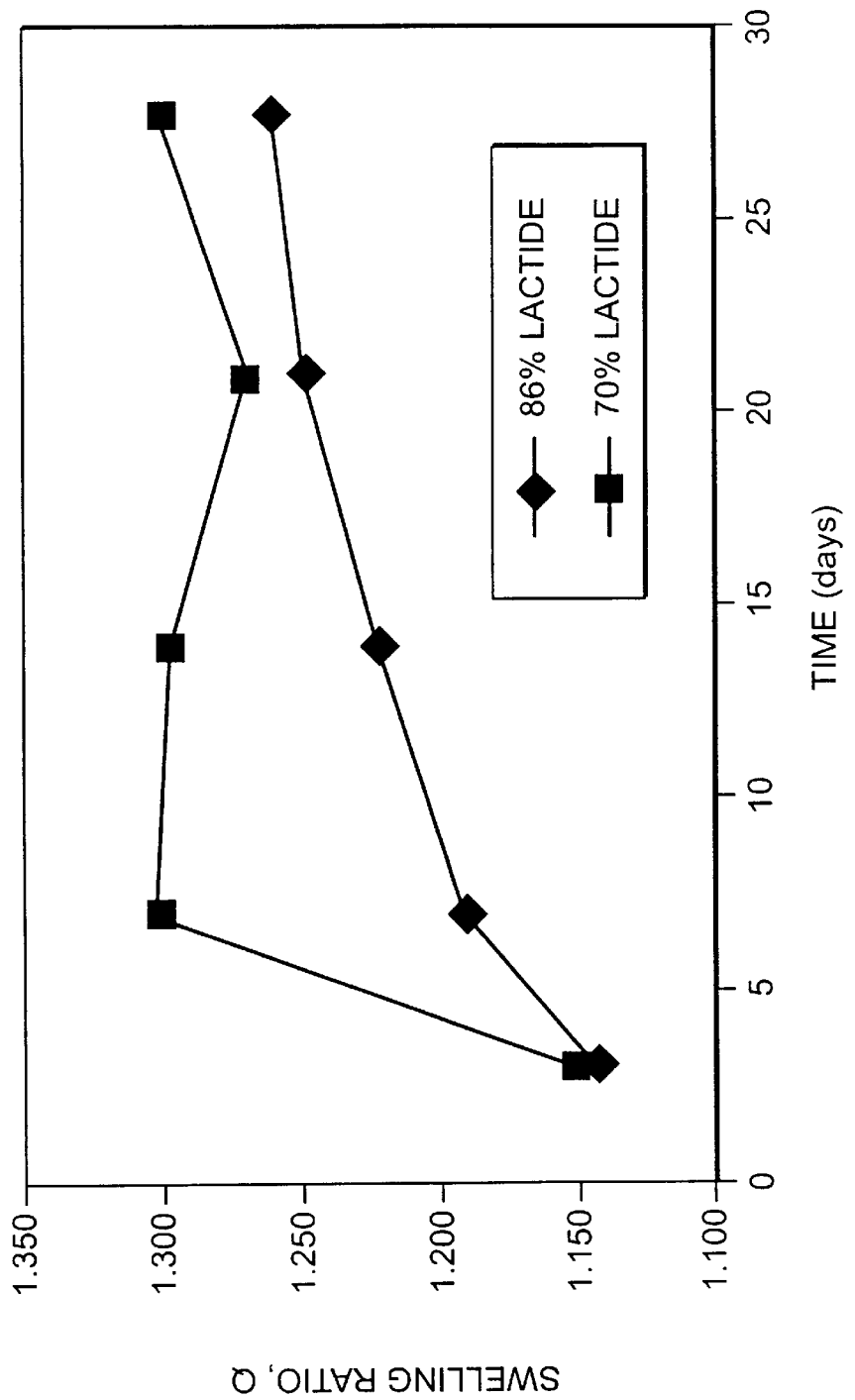
FIG. 13 is a graph showing the swelling ratio over time of poly(EMPO-co-L-lactide) polymers containing 86% lactide and 70% lactide.

FIG. 13 is a graph showing the swelling ratio Q of poly(EMPO-co-L-lactide) copolymers containing 86% lactide and 70% lactide over time. The swelling ratio Q=weight of the polymer wet/weight of the polymer dry. In other words, if Q=1.2, then water uptake of the polymer is 20%. The graph shows that the copolymer that contains 86% lactide has approximately a 25% water uptake after 30 days and that the copolymer that contains 70% lactide has approximately a 30% water uptake after 30 days. These data indicate water uptake characteristics favorable for drug delivery applications. Rapid water uptake causing too much swelling will result in the undesirable burst release of the drug.

The following table summarizes the results of various thermal studies on poly(EMPO-co-L-lactide) copolymers with varying degrees of EMPO incorporated in the polymer chain. Data are provided for the glass transition temperature ($T_g$), that is, the temperature that marks the transition from the glassy to the rubbery state. The data also shows molecular weight data (GPC, gel permeation chromatography, relative to PMMA standards) for the copolymers with varying degrees of EMPO incorporation. The data also shows polydispersity data for the polymers. As used herein, "polydispersity" or "polydispersity index" refers to $M_w/M_n$, wherein $M_w$ is the weight-average molecular weight and $M_n$ is the number-average molecular weight. The polymers of the present invention have polydispersities less than 3.5, preferably less than 3.0, more preferably less than 2.5, and most preferably less than 2.0.

| % EMPO incorporated into copolymer with L-lactide | | | | | |
| --- | --- | --- | --- | --- | --- |
| 31% | 30% | 21% | 19% | 9% | 8% |
| $T_g$ (° C.) | 23.1 | 13.9 | 23.6 | 24.2 | 44.2 | 41.5 |
| $M_n$ | 4600 | 3300 | 4725 | 5875 | 7850 | 8100 |
| $M_w$ | 6900 | 4575 | 7140 | 10,100 | 17,140 | 16,050 |
| $M_w/M_n$ | 1.50 | 1.39 | 1.51 | 1.72 | 2.25 | 1.98 |

Figure 14:
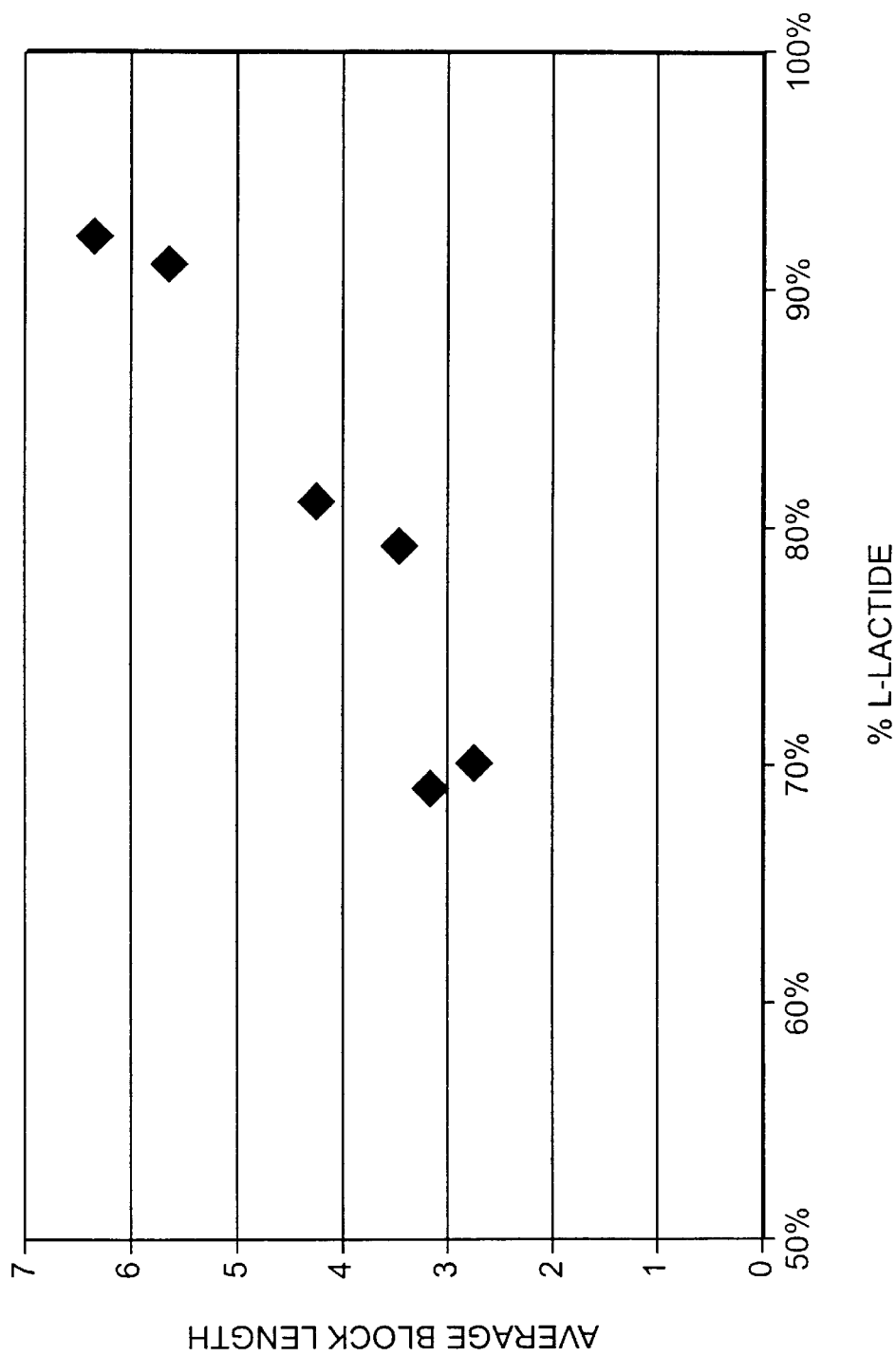
FIG. 14 is a graph showing the average lactide block lengths for poly(EMPO-co-L-lactide) copolymers as a function of percentage L-lactide incorporated in the copolymer composition.

The following table summarizes the average lactide block lengths for poly(EMPO-co-L-lactide) copolymers with varying degrees of EMPO incorporated in the polymer chain. Lactide block lengths were determined by $^{13}$C NMR spectroscopy based on the integration of lactide carbonyl carbon atoms in different chemical environments. These fairly short block lengths demonstrate the randomness and lack of blockiness of the copolymers. A high degree of blockiness would be indicated by block lengths significantly longer than the theoretical minimum block length. These data are represented graphically in FIG. 14.

| % EMPO incorporated into copolymer with L-lactide | | | | | |
| --- | --- | --- | --- | --- | --- |
| | 31% | 30% | 21% | 19% | 9% | 8% |
| Average Lactide Block Length | 3.1 | 2.8 | 3.5 | 4.2 | 5.7** | 6.4** |
| Theoretical Minimum Block Length* | 2.16 | 2.26 | 3.59 | 4.05 | 9.10 | 10.2 |

*Assuming a polymer chain consisting of 100 total monomers with N % EMPO, where N EMPO monomers separate N + 1 blocks of lactide, i.e., where no two EMPO monomers are bound to each other. An increase in EMPO block length would increase the average lactide block length as well.
**Relative integration of $^{13}$C NMR peaks may be less accurate where the peak sizes are so different.

The following table summarizes the results for various copolymers produced according to the present invention. The functionalized epoxide used is EMPO and the cyclic esters used are lactide, glycolide, and caprolactone. Various amounts of EMPO relative to the amount of cyclic ester were used: 50%, 37%, 20%, and 0% EMPO based on percent of the total feed (i.e., both EMPO and cyclic ester). This resulted in an incorporation of 33%, 23%, 11%, and N/A, respectively, of EMPO monomer units into the resulting copolymer. The table also gives the physical characteristics of the copolymers.

| % EMPO incorporated into copolymer | | | |
| --- | --- | --- | --- |
| 33% | 23% | 11% | 0% |
| Lactide | White, slightly tacky solid | White, waxy solid | White powder | White Solid |
| Glycolide | White, slightly waxy solid | White, flaky solid | White powder | — |
| Caprolactone | White, tacky, soft solid | White, waxy, soft solid | White waxy solid | — |

Figure 15:
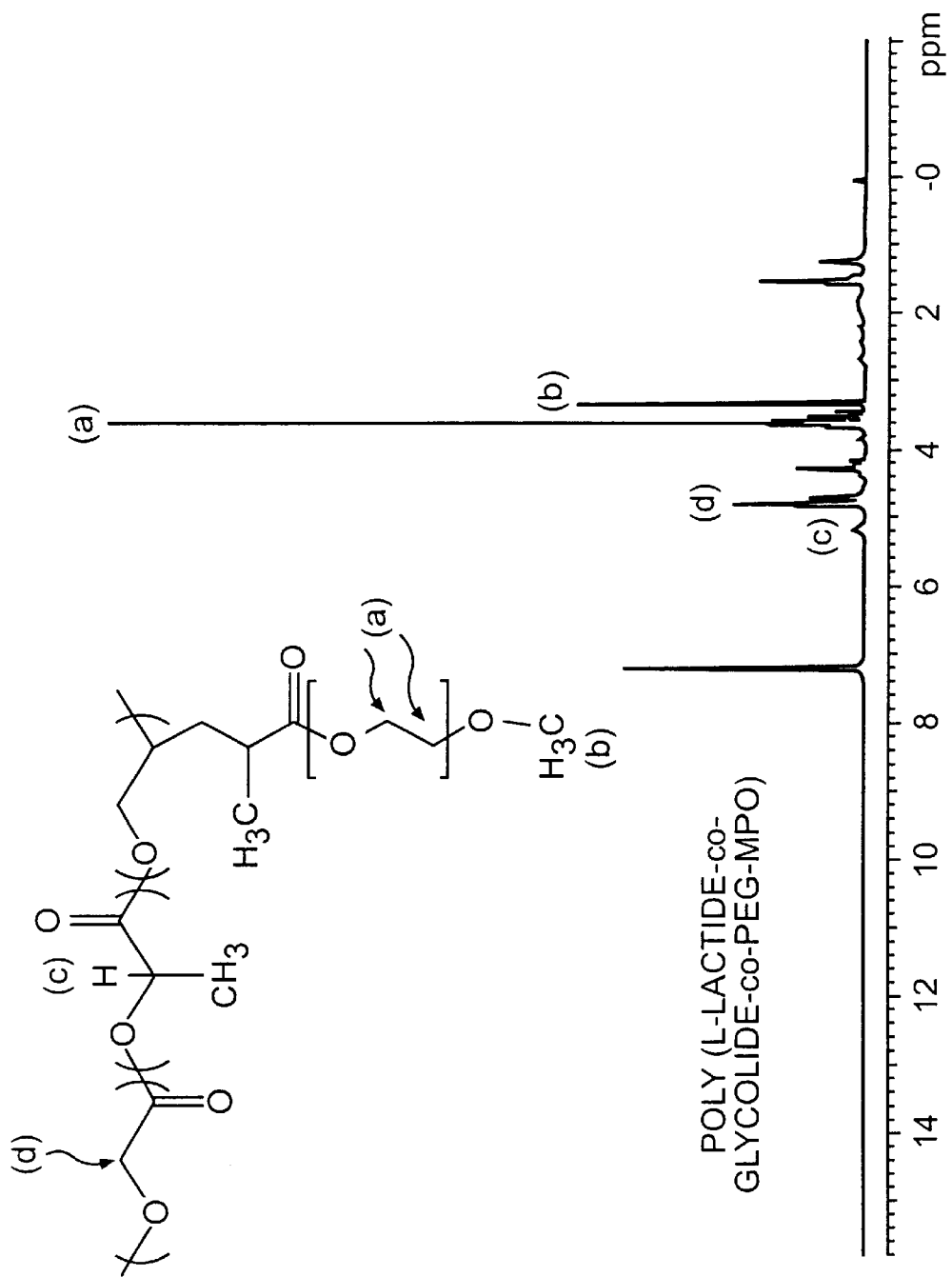
FIG. 15 is the proton ($^1$H) Nuclear Magnetic Resonance (NMR) spectrum of the copolymer of the epoxide, monomethyl polyoxyethylene-2-methyl-pent-4-enoate oxide (PEG-MPO), with lactide and glycolide, abbreviated poly(L-lactide-co-glycolide-co-PEG-MPO).

Copolymerization reactions of the PEG-functionalized epoxide (PEG-MPO) with lactide and/or glycolide were also carried out, resulting in copolymers of the form poly(L-lactide-co-PEG-MPO), poly(glycolide-co-PEG-MPO), and poly(L-lactide-co-glycolide-co-PEG-MPO). The $^1$H NMR spectrum of poly(L-lactide-co-glycolide-co-PEG-MPO) is shown in FIG. 15. This experiment establishes that the functionalized epoxides of the present invention can be copolymerized with more than one cyclic ester. The procedure and the initiating system used were entirely analogous to that used for the copolymerization of EMPO with lactide just described. The following table summarizes the compositions of three of these copolymers, as derived from $^1$H NMR spectra. Also given are results of various thermal studies on the various copolymers with varying degrees of monomers incorporated in the polymer chain. Data are provided for the glass transition temperature ($T_g$), that is, the temperature that marks the transition from the glassy to the rubbery state, and for the crystalline-melting temperature ($T_m$), that is, the temperature that marks the transition from the crystalline state to the liquid state. Thermal transitions were measured using differential scanning calorimetry (DSC).

| % Monomer in Feed (Glycolide/Lactide/ PEG-MPO) | Composition of Polymer (Glycolide/Lactide/ PEG-MPO) | $T_g$ | $T_m$ |
| --- | --- | --- | --- |
| 89/0/11* | 78/0/22*** | No $T_g$ from −40 to 170° C. | 200° C. |
| 67/22/11** | 65/26/10 | No $T_g$ from −40 to 170° C. | 195° C. |
| 44/44/11** | 77/15/8‡ | −7° C. | No $T_m$ from −40 to 210° C. |

*Polymerized with the standard amount of initiator, i.e., 135 μl of the preferred stock solution, at a temperature of 110° C. The polymerization reaction was complete after 5 minutes.
**Polymerized with one-tenth of the standard amount of initiator at a temperature of 70° C.
***This polymer was not completely soluble. The difference between actual and feed compositions was perhaps due to preferential solubility of polymer containing higher amounts of PEG-MPO.
‡The higher reactivity of G compared to L results in higher incorporation of G monomers into copolymer compared to L monomers.

The lack of a melting temperature in the third example indicates that the polymer was amorphous throughout the temperature range. This is further evidence of how the physical properties of these polymers can be affected by functionalization. Amorphous copolymers indicate the randomness and lack of blockiness of the incorporation of the PEG-MPO monomers into the polymer. Amorphous copolymers are particularly useful in drug delivery systems because the polymers would degrade more uniformly.

Figure 16:
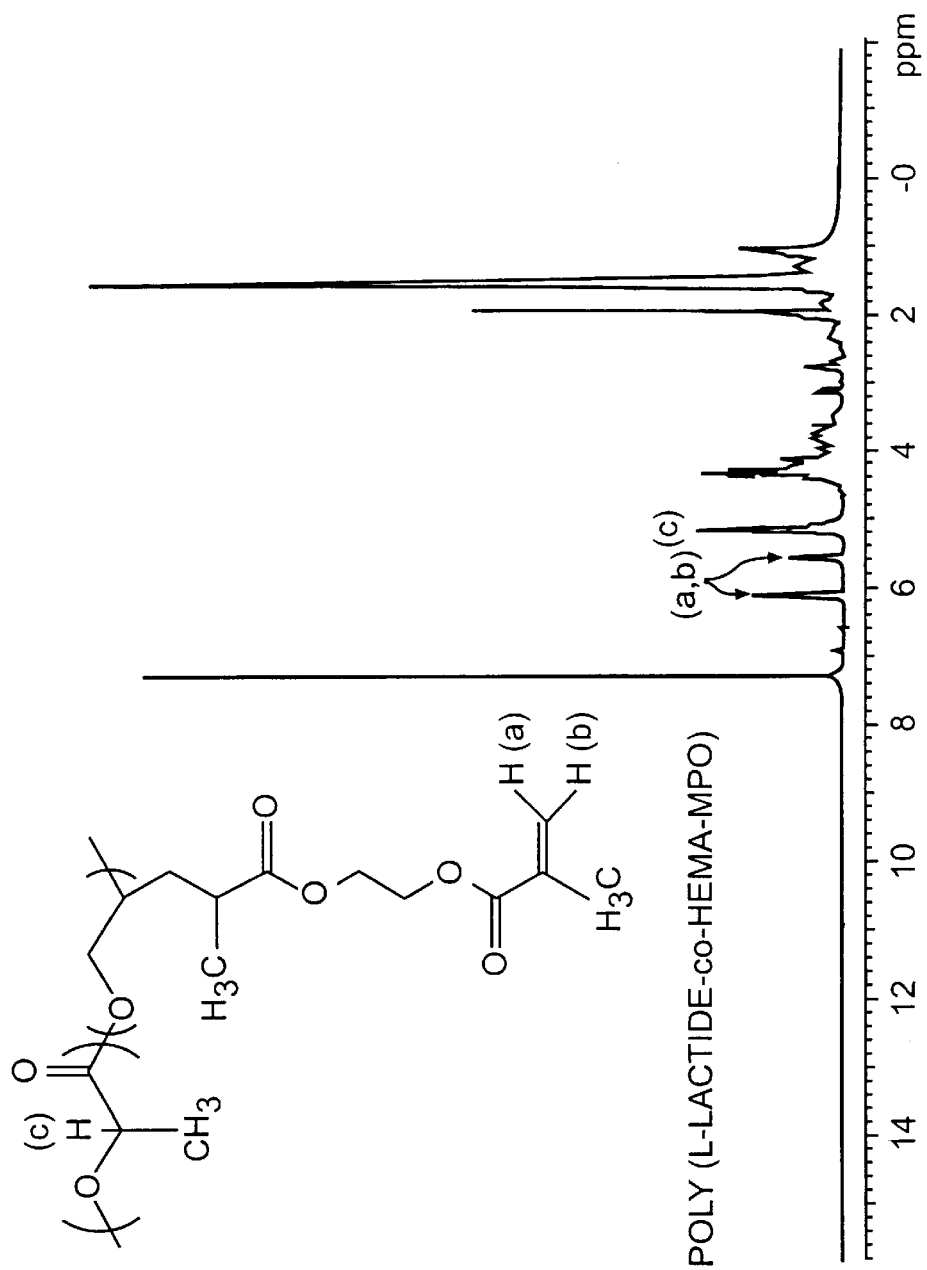
FIG. 16 is the proton ($^1$H) Nuclear Magnetic Resonance (NMR) spectrum of the copolymer of the epoxide, (2'-methacryloyl)ethyl-2-methyl-pent-4-enoate oxide (HEMA-MPO), and L-lactide, abbreviated poly(L-lactide-co-HEMA-MPO).

Copolymerization reactions of the HEMA-functionalized epoxide (HEMA-MPO) with lactide were also carried out. This experiment establishes that unsaturated functionality can be incorporated into the copolymers in order to provide a means for photopolymerization of the methacrylate groups to form crosslinks between polymer chains. The procedure and the initiating system used were entirely analogous to that used for the copolymerization of EMPO with lactide described above. In particular, the polymerization reaction mixture was maintained at 68° C. for 42 to 48 hours before quenching. $^1$H NMR indicated that the ring-opened HEMA-MPO was incorporated into the backbone of the polymer chain in an amount of 19%, compared to a target composition of 23% based on the monomers present in the feed. The $^1$H NMR spectrum of poly(L-lactide-co-HEMA-MPO) is shown in FIG. 16.

The poly(L-lactide-co-HEMA-MPO) copolymer is a photocurable, biodegradable material. When the pendant methacrylate groups are chemically or photochemically polymerized, crosslinks between polymer chains will be formed, which will increase the tensile strength of the material.

It should be appreciated that the present invention also involves the synthesis of copolymers derived from multiple functionalized epoxides, wherein the epoxides have different functionality, i.e., different derivatizable groups G, and one or more cyclic esters. Analogous initiating systems as described above can be used for these copolymerization reactions.

Applications a. Active Agent Delivery Systems:

In one embodiment of the present invention, the polymers synthesized according to the methods of the present invention are used in the preparation of particulates and capsules. In a more preferred embodiment, the present invention relates to improved methods of preparing a pharmaceutical composition in particulate or capsule form. The pharmaceutical composition may be designed for the controlled release of an effective amount of an active agent over an extended period of time.

The methods of the present invention may be carried out using pre-formed particulates, or may additionally comprise the production of the particulates. It should be readily apparent to one skilled in the art, that the present invention is not limited to any particular method of preparing a finished particulate or capsule product. Particulate formation may be effected by methods known to one skilled in the art and include any means of mechanical disruption. Those methods include, but are not limited to, spray drying, sonication, ultrasound, mutual dielectrophoresis, coacervation, and phase separation processes such as those described in U.S. Pat. No. 5,718,921, issued to Mathiowitz et al., entitled "Microspheres Comprising Polymer and Drug Dispersed There Within," and U.S. Pat. No. 6,235,224, issued to Mathiowitz et al., entitled "Process of Preparing Microparticles Through Phase Inversion Phenomena," both patents being incorporated herein by reference. Suitable methods of preparing a particulate or capsule product are disclosed in, for example, the following U.S. Patents, each of which is incorporated herein by reference: U.S. Pat. Nos. 3,737,337; 4,389,330; 5,407,609; 5,650,173; 5,654,008; 5,792,477; 5,916,598; 5,945,126; and 6,110,503.

Particulates and capsules can be prepared using emulsion-based methods, including all emulsion-based processes, including W/O/W, S/O/W, S/O/O, and W/O/O, wherein W=water, O=oil, and S=solid. Suitable emulsion-based methods include phase separation methods that use a coacervating agent. Other suitable emulsion-based methods include non-phase separation methods that use other means for extracting solvent to form hardened particulates. In one preferred embodiment of the present invention using an emulsion-based method to produce particulates or capsules, the method includes preparing an emulsion that comprises a first phase and a second phase. The first phase preferably comprises an active agent, a polymer, and a solvent for the polymer. The second phase is a continuous phase, preferably an aqueous phase. The solvent is extracted from the emulsion to form particulates containing the active agent.

Alternatively, in another preferred embodiment, suitable methods of preparing a finished particulate product are accomplished by using Prolease® technology, developed by Alkermes, Inc. of Cambridge, Mass., and as described in U.S. Pat. No. 5,019,400, issued to Gombotz et al., entitled "Very Low Temperature Casting of Controlled Release Microspheres," and U.S. Pat. No. 5,922,253, issued to Herbert et al., entitled "Production Scale Method of Forming Microprarticles," both incorporated herein by reference. The Prolease®technology generally involves the preparation of particulates using very cold temperatures to freeze mixtures of a polymer and an active agent forming polymeric particulates. More particularly, a polymer is dissolved in a solvent together with an active agent forming a mixture. This mixture is atomized into a vessel containing a liquid non-solvent, alone or frozen and overlayed with a liquefied gas, at a temperature below the freezing point of the polymer/active agent solution. When the combination with the liquefied gas is used, the atomized droplets freeze into particulates upon contacting the cold liquefied gas, then sink onto the frozen non-solvent layer. If frozen, the non-solvent is then thawed. As the non-solvent thaws, the particulates which are still frozen sink into the liquid non-solvent. The solvent in the particulates then thaws and is extracted into the non-solvent, resulting in a hardened particulate containing active agent either as a homogeneous mixture of the polymer and the active agent or as a heterogeneous two phase system of discrete zones of polymer and active agent. If a cold non-solvent is used alone, the atomized droplets freeze upon contacting the solvent, and sink to the bottom of the vessel. As the non-solvent for the polymer is warmed, the solvent in the particulates thaws and is extracted into the non-solvent, resulting in hardened particulates. Excipients that modify or stabilize the particulates can also be incorporated.

A specific example employing Prolease® technology and using the degradable polymers of the present invention is as follows. Poly(L-lactide-co-EMPO) and poly($\epsilon$-caprolactone-co-EMPO) were processed into particulates by the following procedure. The polymer (300 mg) was dissolved in 3 mL of dichloromethane. The polymer solution was then atomized into liquid nitrogen on top of a bed of frozen ethanol. The resulting slurry was stored at −80° C. overnight, where the liquid nitrogen evaporated and the ethanol melted, allowing extraction of dichloromethane into the ethanol, and curing (hardening) of the polymer particulates. Then the particulates were harvested by filtration, dried in a lyophilizer, and sieved using a 180 $\mu$m mesh. The resulting particulates had median diameters of 66 and 79 microns for the poly(L-lactide-co-EMPO) and poly($\epsilon$-caprolactone-co-EMPO), respectively. For active agent-containing particulates, solid active agent particles (e.g., a lyophilized protein powder) are suspended in the polymer solution and sonicated to produce a uniform dispersion prior to atomization into liquid nitrogen.

In addition, in yet another preferred embodiment, suitable methods of preparing a finished particulate product can be accomplished by using the AIRTM inhalation delivery technology, developed by Advanced Inhalation Research, Inc. of Cambridge, Mass., and as described in U.S. Pat. Nos. 5,874,064 and 6,136,295, both issued to Edwards et al., and both entitled "Aerodynamically Light Particles for Pulmonary Drug Delivery," and both incorporated herein by reference. The AIR™ inhalation delivery technology is a pulmonary delivery system whereby active agents are delivered to the respiratory tract. The formation of aerodynamically light particles for use in the AIR™ inhalation delivery technology can be accomplished by various methods known to those of ordinary skill in the art, including single and double emulsion solvent evaporation, spray drying, and solvent extraction.

The polymers of the present invention may also be used to prepare pharmaceutical compositions in particulate or capsule form for oral administration. The pharmaceutical composition may be designed for the controlled release of an effective amount of an active agent over an extended period of time.

The formulation prepared by the process of the present invention may contain an active agent dispersed in the particulate polymeric matrix material. The amount of such agent incorporated in the particulates can range from very small to very large amounts, i.e., from about 0.1 wt. % to about 90 wt. %, preferably 0.5 wt. % to 30 wt. %.

Examples of active agents that can be encapsulated by the particulate or capsule formulation methods of the present invention are legion and include generally, for example, such molecules as peptides, proteins, biopolymers, small molecules, and macromolecules.

More specific examples of active agents include the following: local anesthetics; non-steroidal antifertility agents; parasympathomimetic agents; psychotherapeutic agents; tranquilizers; decongestants; sedative hypnotics; steroids; sulfonamides; sympathomimetic agents; vaccines; vitamins; antimalarials; anti-migraine agents; anti-Parkinson agents such as L-dopa; anti-spasmodics; anticholinergic agents (e.g. oxybutynin); antitussives; bronchodilators; cardiovascular agents such as coronary vasodilators and nitroglycerin; alkaloids; analgesics; narcotics such as codeine, dihydrocodienone, meperidine, morphine and the like; non-narcotics such as salicylates, aspirin, acetaminophen, d-propoxyphene and the like; opioid receptor antagonists, such as naltrexone and naloxone; antibiotics such as gentamycin, tetracycline and penicillins; anti-cancer agents; anti-convulsants; anti-emetics; antihistamines; anti-inflammatory agents such as hormonal agents, hydrocortisone, prednisolone, prednisone, non-hormonal agents, allopurinol, indomethacin, phenylbutazone and the like; prostaglandins and cytotoxic drugs; estrogens; antibacterials; antifungals; antivirals; anticoagulants; anticonvulsants; antidepressants; antihistamines; immunological agents;

Other examples of suitable biologically active agents include viruses and cells, peptides (preferably luteinizing-hormone-releasinghormone analogues, such as goserelin and exendin) and proteins, analogs, muteins, and active fragments thereof, such as immunoglobulins, antibodies, cytokines (e.g. lymphokines, monokines, chemokines), blood clotting factors, hemopoietic factors, interleukins (IL-2, IL-3, IL-4, IL-6), interferons ($\beta$-IFN, $\alpha$-IFN and $\gamma$-IFN), erythropoietin, nucleases, tumor necrosis factor, colony stimulating factors (e.g., GCSF, GM-CSF, MCSF), insulin, enzymes (e.g., superoxide dismutase, tissue plasminogen activator), tumor suppressors, blood proteins, gonadotropins (e.g., FSH, LH, CG, etc.), hormones and hormone analogs (e.g., growth hormone, adrenocorticotropic hormone and luteinizing hormone releasing hormone (LHRH)), vaccines (e.g., tumoral, bacterial and viral antigens); somatostatin; antigens; blood coagulation factors; growth factors (e.g., nerve growth factor, insulin-like growth factor); protein inhibitors, protein antagonists, and protein agonists; nucleic acids, such as antisense molecules, DNA and RNA; oligonucleotides; and ribozymes. Small molecular weight agents suitable for use in the invention include, antitumor agents such as bleomycin hydrochloride, carboplatin, methotrexate and adriamycin; antipyretic and analgesic agents; antitussives and expectorants such as ephedrine hydrochloride, methylephedrine hydrochloride, noscapine hydrochloride and codeine phosphate; sedatives such as chlorpromazine hydrochloride, prochlorperazine hydrochloride and atropine sulfate; muscle relaxants such as tubocurarine chloride; antiepileptics such as sodium phenytoin and ethosuximide; antiulcer agents such as metoclopramide; antidepressants such as clomipramine; antiallergic agents such as diphenhydramine; cardiotonics such as theophillol; antiarrhythmic agents such as propranolol hydrochloride; vasodilators such as diltiazem hydrochloride and bamethan sulfate; hypotensive diuretics such as pentolinium and ecarazine hydrochloride; antidiuretic agents such as metformin; anticoagulants such as sodium citrate and heparin; hemostatic agents such as thrombin, menadione sodium bisulfite and acetomenaphthone; antituberculous agents such as isoniazide and ethanbutol; hormones such as prednisolone sodium phosphate and methimazole.

Other preferred active agents include 1,2-benzazoles, more particularly, 3-piperidinyl-substituted 1,2-benzisoxazoles and 1,2-benzisothiazoles, including 3-[2-[4-(6-fluoro-1,2-benzisoxazol-3-yl)-1-piperidinyl]ethyl]-6,7,8,9-tetrahydro-2-methyl-4H-pyrido[1,2-a]pyrimidin-4-one ("risperidone") and 3-[2-[4-(6-fluro-1,2-benzisoxazol-3-yl-1-piperidinyl]ethyl]-6,7,8,9-tetrahydro-9-hydroxy-2-methyl-4H-pyrido[1,2-a]pyrimidin-4-one ("9-hydroxyrisperidone") and the pharmaceutically acceptable salts thereof. Risperidone (which term, as used herein, is intended to include its pharmaceutically acceptable salts) is also preferred. Risperidone can be prepared in accordance with the teachings of U.S. Pat. No. 4,804,663, which is incorporated herein by reference. 9-hydroxyrisperidone can be prepared in accordance with the teachings of U.S. Pat. No. 5,158,952, which is incorporated herein by reference.

In addition to delivery systems for active agents based on the formation of particulates, such delivery systems can also be formulated using microchips. An example of such systems is described in U.S. Pat. No. 5,797,898, which is incorporated herein by reference. In general, such active agent delivery systems involve etching of reservoirs into a substrate, such as silicon, using any etching technique commonly used in the field of microfabrication, such as chemical (wet) etching or ion (dry) etching techniques. The active agents to be released in a controlled manner are placed in the reservoirs. The reservoirs are capped with a material that degrades at a known rate or has a known permeability for the active agents. The degradable polymers of the present invention can be used to make the substrates into which the reservoirs are etched and/or the caps for the reservoirs. Similar approaches can be used to develop ingestible, injectible or implantable delivery systems that comprise multiple reservoirs containing one or more biologically active agents. The preferred polymer of the present invention is one that can be chemically or photochemically cured.

The polymers of the present invention when used as active agent delivery systems could also be used in applications where it is desirable for the polymer to undergo a phase transition when coming in contact with physiological conditions. Thermoresponsive polymers were described previously, as in U.S. Pat. No. 5,702,717, issued to Cha, et al., entitled "Thermosensitive Biodegradable Polymers Based on Poly(Ether-Ester) Block Copolymers," and U.S. Pat. No. 6,004,573, issued to Rathi et al., entitled "Biodegradable Low Molecular Weight Triblock Poly(Lactide-Co-Glycolide) Polyethylene Glycol Copolymers Having Reverse Thermal Gelation Properties," both of which were previously incorporated herein by reference. The polymers of the present invention could similarly be used when it is desirable to have polymers that are liquid when injected into the body but gel or solidify at body temperatures. Additionally, the polymers of the present invention could be used similarly to the polymers described earlier in U.S. Pat. No. 5,968,542, issued to Tipton, entitled "High Viscosity Liquid Controlled Delivery System as a Device"; U.S. Pat. No. 6,143,314, issued to Chandrashekar et al., entitled "Controlled Release Liquid Delivery Compositions with Low Initial Drug Burst"; and U.S. Pat. No. 5,340,849, issued to Dunn et al., entitled "Biodegradable In-Situ Forming Implants and Methods for Producing the Same," all three patents previously incorporated herein by reference. In this application, polymers dissolved in solvents are injected into the body, after which the polymers solidify as the solvent is replaced by water.

b. Medical Uses Other Than Active Agent Delivery Systems:

The degradable polymers of the present invention can also be used in other medical applications not involving active agent delivery systems. Generally, any medical application that uses a biocompatible and/or degradable polymer would find the polymers of the present invention relevant. Examples of such applications include use as sutures, use as polymer scaffolds for tissue engineering, use in orthopedic applications, such as fracture fixation and bone replacement/healing, use in dental applications, use as prosthetic devices, use for tissue sealant and wound healing.

The applications for active agent delivery systems discussed above wherein it is desirable for the polymers of the present invention to undergo a phase transition when coming in contact with physiological conditions are equally relevant to medical applications wherein the primary purpose is not active agent delivery, but rather those just described, in particular, orthopedic applications, dental applications, and prosthetic devices.

In addition, the degradable polymers of the present invention having unsaturated groups attached to the polymer backbone can be crosslinked, such as through photocuring, radiation, or by chemical means, to produce polymeric networks with the desirable physical characteristic of having high mechanical strength. Potential uses of such high strength materials include orthopedic and dental applications, such as those disclosed in U.S. Pat. No. 5,902,599, issued to Anseth et al., entitled "Biodegradable Polymer Networks For Use in Orthopedic an Dental Applications," and as scaffolds for tissue engineering, such as those disclosed in U.S. Pat. No. 6,103,255, issued to Levene et al., entitled "Porous Polymer Scaffolds for Tissue Engineering." A specific example of a degradable polymer of the present invention having appropriate photopolymerizable groups include the homopolymers of the functionalized epoxide (2'-methacryloyl)ethyl-2-methyl-pent-4-enoate oxide (HEMA-MPO), i.e., poly (HEMA-MPO), and copolymers of HEMA-MPO with cyclic esters. Such crosslinked polymer networks of the present invention would provide available unsaturated moieties all along the polymer backbone, rather than only at the ends of the polymer chains, as disclosed in other such polymer systems. Examples of other such cross-linkable polymeric systems are the following: U.S. Pat. No. 5,626,863, issued to Hubbell et al., entitled "Photopolymerizable Biodegradable Hydrogels as Tissue Contacting materials and Controlled-Release Carriers"; U.S. Pat. No. 5,844,016, issued to Sawhney et al., entitled "Redox and Photoinitiator Priming for Improved Adherence of Gels to Substrates"; U.S. Pat. No. 6,051,248, issued to Sawhney et al., entitled "Compliant "Tissue Sealants"; U.S. Pat. No. 6,153, 211, issued to Hubbell et al., entitled "Biodegradable Macromers for the Controlled Release of Biologically Active Substances"; U.S. Pat. No. 6,201,065, issued to Pathak et al., entitled "Multiblock Biodegradable Hydrogels for Drug Delivery and Tissue Treatment." In addition, U.S. Pat. No. 5,837,752 issued to Shastri et al., entitled "Semi-Interpenetrating Polymer Networks" describes relevant applications wherein polymer compositions are injected into the body and polymerized in vivo for use, such as tissue sealants. Alternatively, the polymer compositions are polymerized ex vivo and then implanted into the body, in the form of various shaped articles, such as pins, screws, and hollow tubes, which can be used to repair broken bones. All of the aforementioned patents are incorporated herein by reference.

The photocurable polymers of the present invention can also be used in connection with known processes such as photolithography, stereolithography, and free form fabrication techniques.

c. Non-Medical Uses:

The degradable polymers of the present invention also can be used in non-medical applications. For example, any non-medical application wherein a degradable polymer might be advantageous is contemplated by the present invention, such as polymers that readily degrade and are thus environmentally friendly.

The degradable polymers of the present invention can also be used as shape memory polymers for making articles that possess shaped memories. The transformation from one shape to another shape can be a reversible process or an irreversible process. The transformation can be induced by a wide variety of forces, for example, changes in temperature (e.g., heating and cooling), sound (e.g., ultrasound), light, electromagnetic forces, and the like. Other such shape memory polymers are described, for example, in U.S. Pat. No. 6,160,084, issued to Langer et al., entitled "Biodegradable Shape Memory Polymers."

Conclusion

While various embodiments of the present invention have been described above, it should be understood that they have been presented by way of example only, and not limitation. The present invention is not limited to a particular functionalized epoxide, homopolymer, copolymer, or initiating system, nor is the present invention limited to a particular scale or batch size. Thus, the breadth and scope of the present invention should not be limited by any of the above-described exemplary embodiments, but should be defined only in accordance with the following claims and their equivalents.

What is claimed is:

1. A copolymer comprising randomly distributed units of a ring-opened functionalized epoxide and a ring-opened cyclic ester, wherein the functionalized epoxide is an epoxide having the composition E-CH$_2$—CHR—C(O)—X-G, wherein E=

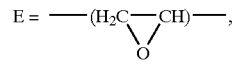

R is hydrogen or alkyl, X is oxygen or nitrogen, and G comprises a derivatizable group.

2. The copolymer of claim 1 wherein the epoxide is functionalized before ring-opening.

3. The copolymer of claim 1 wherein the epoxide is functionalized after polymerization.

4. The copolymer of claim 1, wherein the derivatizable group G is selected from the group consisting of alkyl groups or chains, esters, ethers, sulfonates, carbonates, amino carbonates, carbamates, amides, imides, anhydrides, peptides, lipids, cationic charge carriers, anionic charge carriers, pluronics, PEG, PEO, PPO, urethanes, fatty acids, fatty alcohols, cholesterol, N,N alkyl amines, sugars, and polysaccharides.

5. The copolymer of claim 1 wherein the epoxide is an epoxide of an ester of 2-methyl-pent-4-enoic acid.

6. The copolymer of claim 5 wherein the ester of 2-methyl-pent-4-enoic acid is ethyl-2-methyl-pent-4-enoate [EMP].

7. The copolymer of claim 5 wherein the ester of 2-methyl-pent-4-enoic acid is monomethyl polyethylene oxide-2-methyl-pent-4-enoate [PEG-MP].

8. The copolymer of claim 5 wherein the ester of 2-methyl-pent-4-enoic acid is (2'-methacryloyl)ethyl-2-methyl-pent-4-enoate [HEMA-MP].

9. The copolymer of claim 1, wherein the ring-opened cyclic ester is selected from one or more of the group consisting of lactide, glycolide, caprolactone, 1,4-dioxan-2-one, and cyclic carbonates.

10. The copolymer of claim 1 wherein the copolymer is degradable.

11. A method of making a copolymer comprising randomly polymerizing a functionalized epoxide and a cyclic ester, wherein the functionalized epoxide is an epoxide having the composition E-CH$_2$—CHR—C(O)—X-G, wherein E=

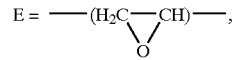

R is hydrogen or alkyl, X is oxygen or nitrogen, and G comprises a derivatizable group.

12. The method of claim 11, wherein the derivatizable group G is selected from the group consisting of alkyl groups or chains, esters, ethers, sulfonates, carbonates, amino carbonates, carbamates, amides, imides, anhydrides, peptides, lipids, cationic charge carriers, anionic charge carriers, pluronics, PEG, PEO, PPO, urethanes, fatty acids, fatty alcohols, cholesterol, N,N alkyl amines, sugars, and polysaccharides.

13. The method of claim 11, wherein the cyclic ester is selected from one or more of the group consisting of lactide, glycolide, caprolactone, 1,4-dioxan-2-one, and cyclic carbonates.

14. The method of claim 11 wherein the copolymer is degradable.

15. The copolymer formed by the method of claim 11.

16. The method of claim 11, wherein randomly polymerizing the functionalized epoxide and cyclic ester further comprises using an initiating system that permits polymerization at a temperature of less than about 100° C.

17. The method of claim wherein the temperature is less than about 90° C.

18. A degradable polymer comprising a backbone comprised of randomly distributed ether and ester linkages, having the formula:

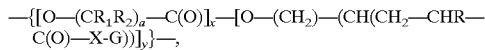

wherein R=H or alkyl; $R_1$=H, alkyl or substituted alkyl; $R_2$=H, alkyl, or substituted alkyl; X is oxygen or nitrogen; and G comprises a derivatizable group; and wherein a 1 to 5; x is greater or equal to one; and y is greater or equal to one.

19. The degradable polymer of claim 18, wherein the derivatizable group G is selected from the group consisting of alkyl groups or chains, esters, ethers, sulfonates, carbonates, amino carbonates, carbamates, amides, imides, anhydrides, peptides, lipids, cationic charge carriers, anionic charge carriers, pluronics, PEG, PEO, PPO, urethanes, fatty acids, fatty alcohols, cholesterol, N,N alkyl amines, sugars, and polysaccharides.

20. The degradable polymer of claim 18, wherein the derivatizable group G comprises unsaturated functionality.

21. The degradable polymer of claim 18, wherein the unsaturated functionality is chemically or photochemically cured.

22. The degradable polymer of claim 18, wherein the derivatizable group G comprises an ester and unsaturated functionality.

23. The degradable polymer of claim 18, wherein the ester linkage, $[O-(CR_1R_2)_a-C(O)]_x$, is derived from one or more of the group consisting of lactide, glycolide, caprolactone, 1,4-dioxan-2-one, and cyclic carbonates.

24. The degradable polymer of claim 18, wherein the ratio of an average ester linkage block length to a theoretical minimum block length, when no two ether linkages are bound to each other, is approximately one.

25. A degradable polymer comprising a backbone of randomly distributed ether and ester linkages, wherein the ether linkages comprise a functionalized ring-opened epoxide, wherein the functionalized epoxide has the composition E-$CH_2$—CHR—C(O)—X-G, wherein E=

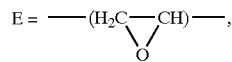

R is hydrogen or alkyl, X is oxygen or nitrogen, and G comprises a derivatizable group and the ester linkages are derived from one or more of the group consisting of lactide, glycolide, caprolactone, 1,4-dioxan-2-one, and cyclic carbonates.

26. The degradable polymer of claim 25, wherein the derivatizable group is selected from the group consisting of alkyl groups or chains, esters, ethers, sulfonates, carbonates, amino carbonates, carbamates, amides, imides, anhydrides, peptides, lipids, cationic charge carriers, anionic charge carriers, pluronics, PEG, PEO, PPO, urethanes, fatty acids, fatty alcohols, cholesterol, N,N alkyl amines, sugars, and polysaccharides.

27. The degradable polymer of claim 25, wherein the derivatizable group comprises unsaturated functionality.

28. The degradable polymer of claim 27, wherein the unsaturated functionality is chemically or photochemically cured.

29. The degradable polymer of claim 25, wherein the derivatizable group comprises an ester and unsaturated functionality.

30. A copolymer comprising randomly distributed units of a ring-opened functionalized epoxide and a ring-opened cyclic ester, wherein the ratio of an average ring-opened cyclic ester unit block length to a theoretical minimum block length, when no two ring-opened functionalized epoxide units are bound to each other, is approximately one.

31. The polymer as in claims 1, 15, 18, or 25, formed by ring-opening copolymerization of a functionalized epoxide and a cyclic ester.

32. The polymer of claim 31, wherein the functionalized epoxide acts as a solvent for the cyclic ester.

33. The polymer as in claims 1, 15, 18, or 25 wherein the polymers each have a polydispersity ($M_w/M_n$) of less than about 3.5.

34. The polymer as in claims 1, 15, 18, or 25 wherein the polymers each have a polydispersity ($M_w/M_n$) of less than about 3.0.

35. The polymer as in claims 1, 15, 18, or 25 wherein the polymers each have a polydispersity ($M_w/M_n$) of less than about 2.5.

36. The polymer as in claims 1, 15, 18, or 25 wherein the polymers each have a polydispersity ($M_w/M_n$) of less than about 2.0.

* * * * *